United States Patent [19]

Latham

[11] Patent Number: 5,260,912
[45] Date of Patent: Nov. 9, 1993

[54] SIDE-LOOKING FISH FINDER
[75] Inventor: Mark W. Latham, Boise, Id.
[73] Assignee: Computrol, Inc., Meridian, Id.
[21] Appl. No.: 7,356
[22] Filed: Jan. 21, 1993

Related U.S. Application Data

[63] Continuation of Ser. No. 702,278, May 17, 1991, abandoned.
[51] Int. Cl.$^5$ .............................................. G01S 15/96
[52] U.S. Cl. ............................. 367/88; 367/98; 367/99; 367/104; 367/111; 367/900; 367/901
[58] Field of Search ................ 367/98, 99, 104, 900, 367/901, 111, 88

[56] References Cited

U.S. PATENT DOCUMENTS

| | | | |
|---|---|---|---|
| D. 278,690 | 5/1985 | Steensland et al. | D10/46 |
| D. 329,615 | 9/1992 | Stiner | D10/46 |
| D. 329,616 | 9/1992 | Stiner | D10/46 |
| 3,548,370 | 12/1970 | Hoxsie | 367/114 |
| 3,683,324 | 8/1972 | Hoxsie | 367/114 |
| 3,721,124 | 3/1973 | Franks | 374/137 |
| 3,740,705 | 6/1973 | Lowrance | 367/112 |
| 3,747,053 | 7/1973 | Austin | 367/109 |
| 3,752,431 | 8/1973 | McBride | 367/173 |
| 3,781,777 | 12/1973 | Lowrance | 367/107 |
| 3,845,928 | 11/1974 | Barrett et al. | 248/291 |
| 3,879,697 | 4/1975 | Richard | 367/106 |
| 3,946,295 | 3/1976 | Moore | 388/822 |
| 3,950,724 | 4/1976 | Honda | 367/105 |
| 4,084,150 | 4/1978 | Massa | 367/155 |
| 4,110,727 | 8/1978 | Kriege | 367/157 |
| 4,186,372 | 1/1980 | Maloy | 367/115 |
| 4,189,702 | 2/1980 | Maloy | 367/109 |
| 4,198,702 | 4/1980 | Clifford | 367/88 |
| 4,225,951 | 9/1980 | Menin et al. | 367/108 |
| 4,282,590 | 8/1981 | Wingate | 367/104 |
| 4,322,827 | 3/1982 | Weber | 367/99 |
| 4,369,508 | 1/1983 | Weber | 367/115 |
| 4,420,824 | 12/1983 | Weber | 367/98 |
| 4,456,210 | 6/1984 | McBride | 248/205.5 |
| 4,479,206 | 10/1984 | Granberg et al. | 367/104 |
| 4,480,809 | 11/1984 | Healey | 248/185 |
| 4,612,633 | 9/1986 | Weber | 367/115 |
| 4,829,493 | 5/1989 | Bailey | 367/111 |
| 4,873,676 | 10/1989 | Bailey et al. | 367/111 |
| 4,879,697 | 11/1989 | Lowrance et al. | 367/111 |
| 4,888,747 | 12/1989 | Williams | 367/173 |
| 4,907,208 | 3/1990 | Lowrance et al. | 367/154 |
| 4,938,165 | 7/1990 | Williams et al. | 114/343 |
| 4,949,318 | 8/1990 | Patrick et al. | 367/135 |
| 4,951,268 | 8/1990 | Grall | 367/88 |
| 4,980,868 | 12/1990 | Teel | 367/99 |
| 5,065,371 | 11/1991 | Leavell et al. | 367/111 |
| 5,109,364 | 4/1992 | Stiner | 367/165 |
| 5,142,502 | 8/1992 | Wilcox et al. | 367/88 |
| 5,142,505 | 8/1992 | Peynaud | 367/103 |
| 5,148,412 | 9/1992 | Suggs | 367/107 |
| 5,160,931 | 11/1992 | Brown | 342/25 |
| 5,163,026 | 11/1992 | Peynaud | 367/101 |

OTHER PUBLICATIONS

"New Wesmar Powerscan Sonars", marketing brochure, 4 pages, 1985.
Kristensen, Finn, Hogne; "Simrad's New Sonar Flagship", Newsletter Article, pp. 4–5, Jan. 1991.
"Wesmar Digital Color Sonar", marketing brochure, 4 pages, 1986.
Taylor, Buck; "Latest Skywalker Sonar!", Fishing World, pp. 12–13 Nov. 1992.
"A Sonar", pp. 14–15, Jan. 1991, Simrad Newsletter.
"Scout Owner's Manual", Computrol Inc., 1991.
Eagle Model 3D-100 manual, 1987, pp. 16 and 17.

*Primary Examiner*—Daniel T. Pihulic
*Attorney, Agent, or Firm*—Flynn, Thiel, Boutell & Tanis

[57] ABSTRACT

A side-looking fish finding apparatus transmits a sonar pulse approximately horizontally into a body of water, and then monitors echoes from the pulse. The time interval between successive sonar pulses is varied in a random manner in order to permit two or more similar units to be used in close proximity to each other without significantly interfering with each other. An individual echo is treated as the detection of a fish if it has a magnitude above a predetermined threshold, if it has a length within a predetermined range bounded by upper and lower limits, if it is preceded by a leading space interval free of other echoes and having a predetermined duration, if it is followed by a trailing space interval free of other echoes and having a predetermined duration, the duration of the trailing space interval being less than the duration of the leading space interval, and if an equivalent echo is received in response to each of the next four successive sonar pulses.

59 Claims, 13 Drawing Sheets

DISPLAY CONNECTORS

| zlcd | J6 | | J4 | | zlcd |
|---|---|---|---|---|---|
| zlcd0 | row0 | 1 | 1 | com38 | zlcd95 |
| zlcd1 | row1 | 2 | 2 | com37 | zlcd94 |
| zlcd2 | row2 | 3 | 3 | com36 | zlcd93 |
| zlcd3 | row3 | 4 | 4 | com35 | zlcd92 |
| zlcd4 | row4 | 5 | 5 | com34 | zlcd91 |
| zlcd5 | row5 | 6 | 6 | com33 | zlcd90 |
| zlcd6 | row6 | 7 | 7 | row4 | zlcd89 |
| zlcd7 | row7 | 8 | 8 | row5 | zlcd88 |
| zlcd8 | com0 | 9 | 9 | row6 | zlcd87 |
| zlcd9 | com1 | 10 | 10 | row7 | zlcd86 |
| zlcd10 | com2 | 11 | 11 | com33 | zlcd85 |
| zlcd11 | com3 | 12 | 12 | com38 | zlcd84 |
| zlcd12 | com4 | 13 | 13 | com37 | zlcd83 |
| zlcd13 | com5 | 14 | 14 | com36 | zlcd82 |
| zlcd14 | com6 | 15 | 15 | com35 | zlcd81 |
| zlcd15 | com7 | 16 | 16 | com34 | zlcd80 |
| zlcd16 | com8 | 17 | 17 | com33 | zlcd79 |
| zlcd17 | com9 | 18 | 18 | row12 | zlcd78 |
| zlcd18 | com10 | 19 | 19 | row13 | zlcd77 |
| zlcd19 | com11 | 20 | 20 | row14 | zlcd76 |
| zlcd20 | com12 | 21 | 21 | row15 | zlcd75 |
| zlcd21 | com13 | 22 | 22 | com33 | zlcd74 |
| zlcd22 | com14 | 23 | 23 | com1 | zlcd73 |
| zlcd23 | com15 | 24 | 24 | com0 | zlcd72 |
| zlcd24 | com16 | 25 | 25 | com40 | zlcd71 |
| zlcd25 | com17 | 26 | 26 | com39 | zlcd70 |
| zlcd26 | com18 | 27 | 27 | row0 | zlcd69 |
| zlcd27 | com19 | 28 | 28 | row1 | zlcd68 |
| zlcd28 | com20 | 29 | 29 | row2 | zlcd67 |
| zlcd29 | com21 | 30 | 30 | row3 | zlcd66 |
| zlcd30 | com22 | 31 | 31 | row15 | zlcd65 |
| zlcd31 | com23 | 32 | 32 | com0 | zlcd64 |
| zlcd32 | com24 | 33 | 33 | com1 | zlcd63 |
| zlcd33 | com25 | 34 | 34 | com38 | zlcd62 |
| zlcd34 | com26 | 35 | 35 | com37 | zlcd61 |
| zlcd35 | com27 | 36 | 36 | com36 | zlcd60 |
| zlcd36 | com28 | 37 | 37 | com35 | zlcd59 |
| zlcd37 | com29 | 38 | 38 | com34 | zlcd58 |
| zlcd38 | com30 | 39 | 39 | com33 | zlcd57 |
| zlcd39 | com31 | 40 | 40 | com38 | zlcd56 |
| zlcd40 | com32 | 41 | 41 | com37 | zlcd55 |
| zlcd41 | row15 | 42 | 42 | com36 | zlcd54 |
| zlcd42 | row14 | 43 | 43 | com35 | zlcd53 |
| zlcd43 | row13 | 44 | 44 | com34 | zlcd52 |
| zlcd44 | row12 | 45 | 45 | com33 | zlcd51 |
| zlcd45 | row11 | 46 | 46 | row8 | zlcd50 |
| zlcd46 | row10 | 47 | 47 | row10 | zlcd49 |
| zlcd47 | row9 | 48 | 48 | row11 | zlcd48 |

FIG. 3D

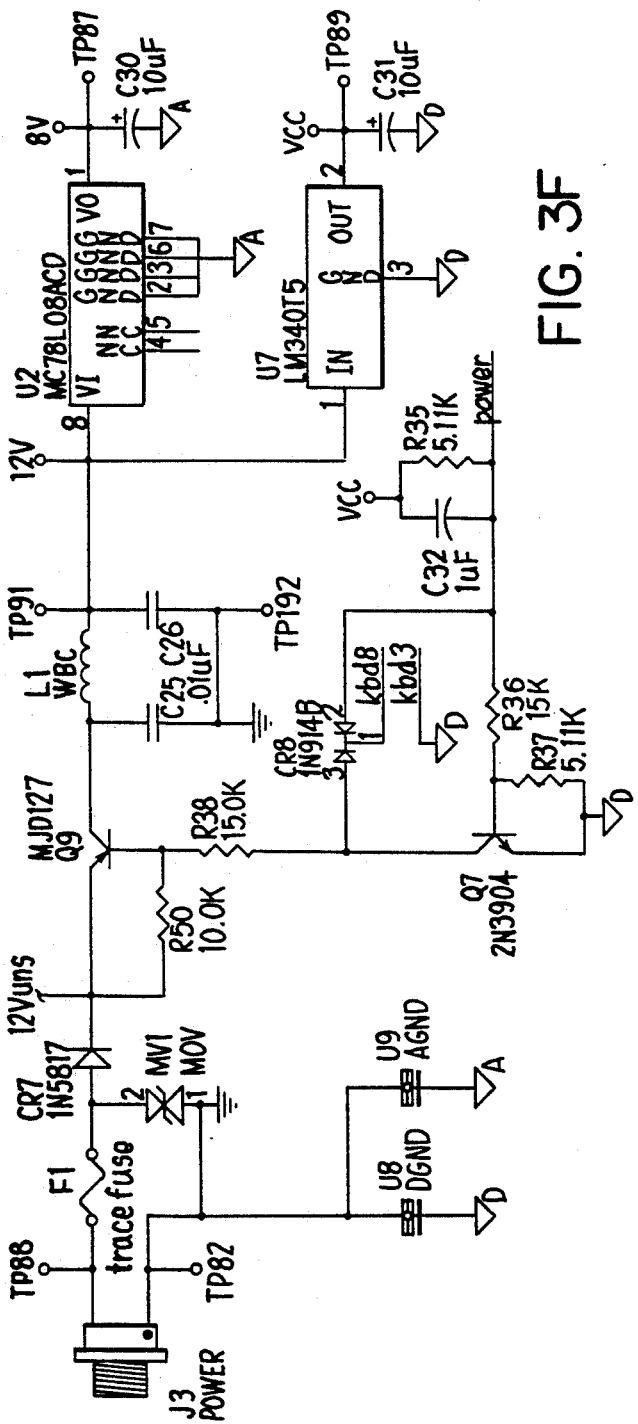
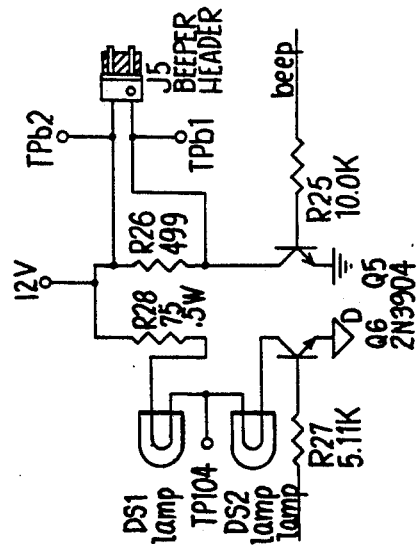
FIG. 3F
FIG. 3G

© 1990 COMPUTROL, INC.

© 1990 COMPUTROL, INC.

SIDE-LOOKING FISH FINDER

This application is a continuation of U.S. Ser. No. 07/702,278, filed May 17, 1991 now abandoned.

STATEMENT REGARDING COPYRIGHT RIGHTS

A portion of the disclosure of this patent document material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to an apparatus for detecting objects in water and, more particularly, to such an apparatus which looks for objects in a generally horizontal direction and which can efficiently distinguish fish from other types of objects in the water.

BACKGROUND OF THE INVENTION

In a traditional down-looking fish finding apparatus, a sonar pulse is transmitted approximately straight down into the water. The surface at the bottom of the body of water usually produces a relatively large and direct upward reflection back to the transducer, and it is thus usually possible to easily identify the reflection caused by the bottom surface. The assumption is made that there is little or nothing between the top surface and the bottom surface except fish, and thus virtually all echoes arriving before the large echo from the bottom surface are treated as detected fish. A few systems discard all echoes arriving within a short predetermined time interval just before the large reflection from the bottom surface, on the theory that they represent weeds or logs on the bottom surface, or irregularities in the bottom surface itself.

The present invention relates to a side-looking fish finding apparatus, or in other words an apparatus which transmits a sonar pulse in an approximately horizontal direction in an attempt to locate objects along a path located just below and extending approximately parallel to the surface of the body of water. A side-looking apparatus faces a significantly more complex situation than a traditional down-looking apparatus. First, there is typically no large and easily identifiable echo from the bottom surface, because the sonar pulse is traveling approximately parallel to the bottom surface and a flat or slightly inclined bottom will reflect most of the pulse so that it continues to propogate in approximately the same horizontal direction. If the water to air interface is smooth, the same phenomena can occur at that interface, which produces a channeling effect commonly referred to as bottom skimming without a large reflection back to the transducer. Thus, only a small portion of the pulse intensity is typically reflected from the bottom surface back toward the transducer, and in fact there may be several weak bottom reflections spaced in time, depending on the shape of the bottom surface. Some of these weak reflections may arrive before reflections from fish of interest. Moreover, a variety of other objects of significant size may be located between the transducer and fish which are to be detected, such as rocks, tree stumps, dock support poles, retaining walls, sand bars, and so forth. These objects can produce relatively large echoes which arrive before echoes from objects of interest such as fish. Weeds growing on the bottom surface may also produce an echo pattern. Consequently, the relatively simple techniques used in down-looking systems, namely treating all echoes received prior to a large bottom echo as fish and ignoring all echoes received subsequent to the bottom echo, simply are not suitable for use in a side-looking system.

Existing side-looking systems are relatively expensive, and typically report virtually all of the echoes which they receive without attempting to discriminate echoes produced by fish from echoes produced by other objects.

A further problem with existing side-looking systems is that, when two or more systems are used in close proximity to each other, they are more likely to interfere with each other than would be the case with traditional down-looking systems, because of the fact that pulses are transmitted horizontally toward other boats rather than directly downwardly. For example, if two units made by the same manufacturer are being used in different boats which are located near each other, and if the periodic transmission of pulses by these units comes into synchronization with each other, one or both of the units could receive not only echoes from its own sonar pulses, but also echoes from sonar pulses produced by the other unit, which could generate false readings.

Accordingly, an object of the present invention is to provide a side-looking apparatus for detecting objects in water which is capable of efficiently discriminating echoes produced by fish from echoes produced by other objects.

A further object is to provide such a system which is relatively inexpensive in comparison to known side-looking systems.

A further object is to provide such a system in which two or more identical units can be simultaneously used in close proximity to each other with little or no risk of erroneous readings.

A further object is to provide such a system which is relatively compact and light, and which is highly reliable.

SUMMARY OF THE INVENTION

The objects and purposes of the invention, including those set forth above, are met according to the present invention by a method of detecting fish in a body of water which includes the steps of transmitting a sound pulse through the water in a predetermined direction, and thereafter detecting echoes from the sound pulse which are proceeded by a leading space interval free of other echoes and followed by a trailing space interval free of other echoes. According to one form of the present invention, echoes are rejected if the trailing space interval is less than a predetermined trailing time duration, whereas according to another form of the invention echoes are rejected if the echo duration falls outside a predetermined range.

According to a different form of the invention, a method of detecting objects in a body of water includes the steps of periodically transmitting a pulse of sound in a predetermined direction and thereafter monitoring echoes of the sound reflected from objects in the water, and randomly varying the length of a time interval between successive transmitting steps.

Yet another form of the present invention involves a method of detecting fish in a body of water which includes the steps of emitting a sound pulse into the body of water, detecting echoes from the sound pulse and normalizing magnitudes thereof based on distances traveled through the water, comparing the normalized magnitude of each echo to a reference magnitude which is a minimum normalized magnitude produced by a fish of interest, and rejecting echoes having normalized magnitudes below the reference magnitude.

BRIEF DESCRIPTION OF THE DRAWINGS

One preferred embodiment of the present invention is described in detail hereinafter with reference to the accompanying drawings, in which:

FIGS. 3A–3G are respective portions of a detailed schematic diagram of a circuit implementing a control unit which is a component of the apparatus of FIG. 1;

DETAILED DESCRIPTION

Figure 1:
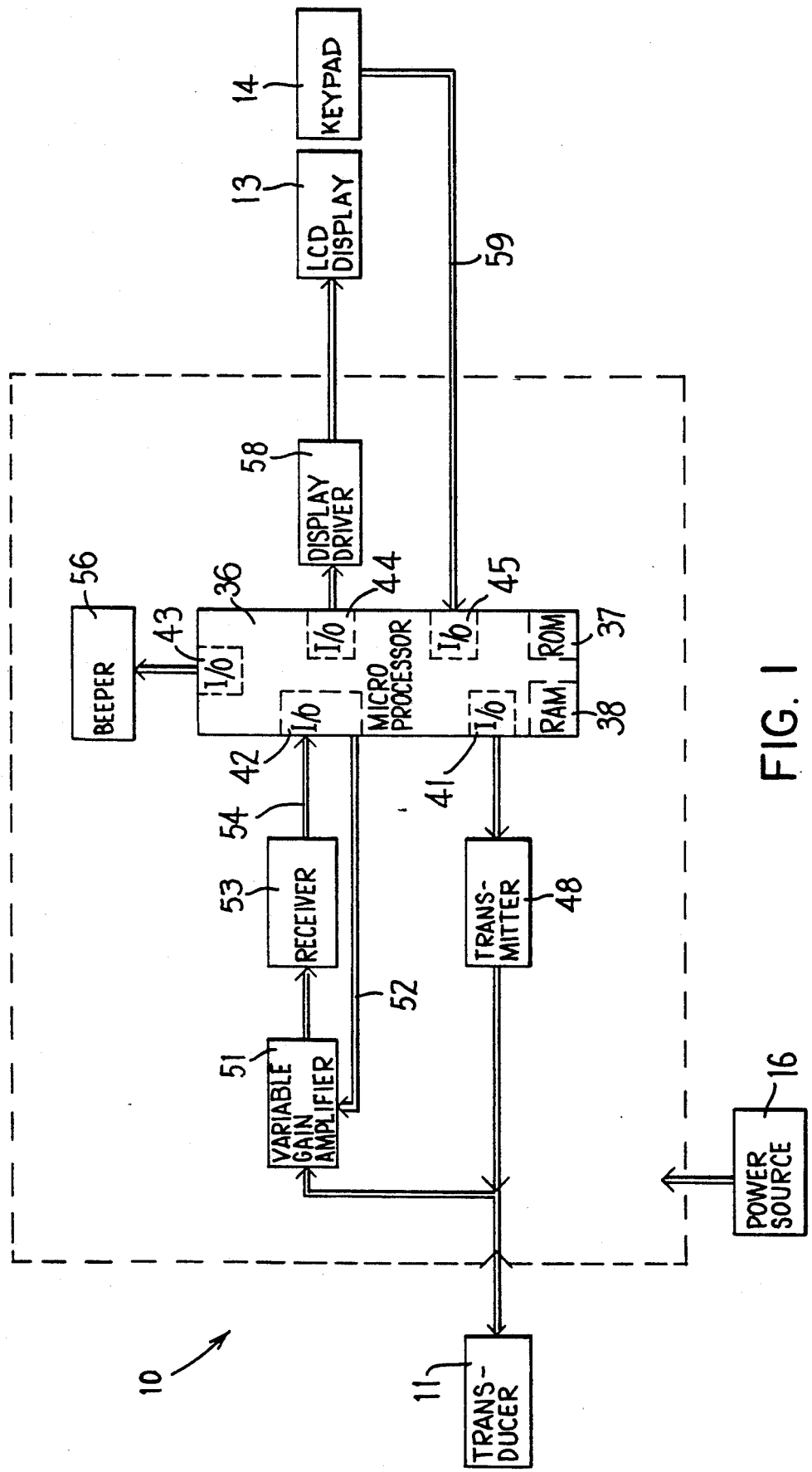
FIG. 1 is a block diagram of a side-looking fish finding apparatus embodying the present invention.

A preferred embodiment of a fish finder system 10 according to the present invention is shown in FIG. 1, and includes a transducer 11, a control circuit 12, a liquid crystal (LCD) display 13, a keypad 14, and a power source 16. The system 10 is typically used in a boat, and the power source 16 can be a conventional 12 volt battery of the type used to power electric trolling motors and to start internal combustion boat engines.

Figure 2:
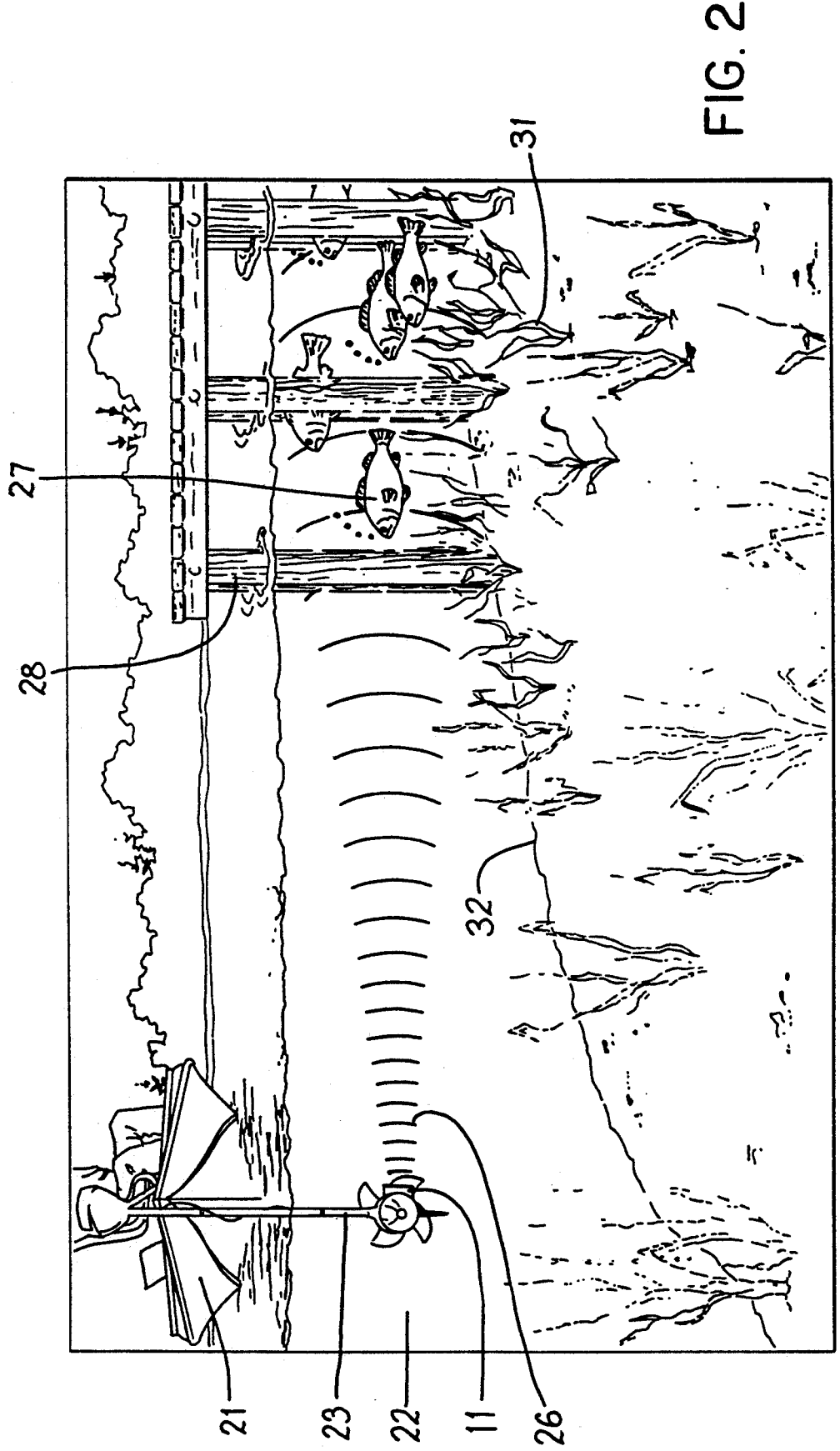
FIG. 2 is a side view of an underwater environment which the apparatus of FIG. 1 can be used to monitor.

The transducer 11 is a conventional and commercially available part, and is therefore not illustrated and described in detail. In the preferred embodiment, the transducer is a model 235-200KHz-2.0 manufactured by Radarsonics, Inc. of Anaheim, Calif. Referring to FIG. 2, a boat 21 is floating in a body of water 22 such as a lake and carries a conventional electric trolling motor 23, and the transducer 11 is mounted at the lower end of the motor 23. It will be recognized that the transducer 11 can also be supported in other ways, for example on a not-illustrated bracket affixed to the boat 21. However, mounting the transducer 11 on the motor has the advantage of allowing the transducer to be pointed in any horizontal direction simply by appropriately orienting the motor. The transducer produces a generally conical beam pattern which propagates at least 120 feet and which has a 9° spread, the spread being measured as the angle off beam center where the intensity is down 3 decibels (which is at 4.5° for a transducer rated at 9°). The control circuit 12 causes the transducer 11 to periodically emit a sonar pulse shown diagrammatically at 26, and to then receive not-illustrated echoes of the pulse reflected from objects in the water such as fish 27, support poles 28 for a dock, a bottom surface 32 of the lake, and weeds 31 growing on the bottom surface. A feature of the present invention is that control circuit 12 (FIG. 1) is designed to be efficient in distinguishing echoes produced by fish 27 from echoes produced by other objects such as the support poles 28, weeds 31 and bottom surface 32.

In FIG. 1, the control circuit 12 includes a central processing unit (CPU) in the form of a microprocessor 36, which in the preferred embodiment is a microcontroller device containing not only the CPU but also some read only memory (ROM) 37 storing a computer program and data constants, a random access memory (RAM) 38 in which the CPU can dynamically save and retrieve information, and several input/output (I/O) ports 41–45 through which the central processing unit can receive input from other circuits and/or send control signals to other circuits.

Through the I/O port 41, the CPU 36 can cause a transmitter circuit 48 to send to the transducer 11 a signal at a frequency which causes the transducer 11 to emit a sonar pulse such as that shown at 26 in FIG. 2. The microprocessor 36 then disables the transmitter 48. As echoes from the sonar pulse are subsequently collected by the transducer 11, they pass through a variable gain amplifier 51 to a receiver 53. The gain of the amplifier 51 is controlled by the microprocessor 36 through control lines 52. In particular, the microprocessor 36 progressively increases the gain of the amplifier 51 over time following transmission of a sonar pulse, in order to normalize the amplitude or magnitude of received echoes, because later-arriving echoes will be weaker than earlier echoes due to divergence of the pulse itself as it travels away from the transducer, and due to additional attenuation experienced by the later-arriving pulse in view of the fact that it has traveled farther through the water and thus experienced more of the natural attenuation of the water.

The receiver 53 determines whether the normalized magnitude of each echo is sufficient to justify passing the echo on to the microprocessor 36. If not, the echo is suppressed by the receiver 53. Otherwise, the echo is supplied at 54 from the receiver 53 to the microprocessor 36 through I/O port 42. The signal at 54 is a digital signal having a logic low value when the receiver has determined that a valid echo is present, and a logic high value when there is no echo or only a weak echo which the receiver is suppressing. The length of time that the signal on line 54 is in a logic high state reflects the time duration of the echo.

Through the I/O port 43, the microprocessor 36 controls a beeper 56, which can be used to produce an audible sound. Through the I/O port 44, the microprocessor 36 controls a display driver circuit 58, which in turn drives the LCD display 13. The keypad 14 has output lines 59, which are connected to the microprocessor 36 through I/O port 45.

FIGS. 3A–3G are respective portions of an electrical schematic diagram for the entire control circuit shown at 12 in FIG. 1. It is believed that those of ordinary skill in the art will recognize from FIG. 1 how to implement the control circuit shown at 12 in FIG. 1, but FIGS. 3A–3G are nevertheless provided in order to ensure that at least one suitable implementation of the control circuit 12 is readily available. FIGS. 3A–3G are not discussed in detail here, but are briefly discussed for purposes of convenience.

Figure 3A:
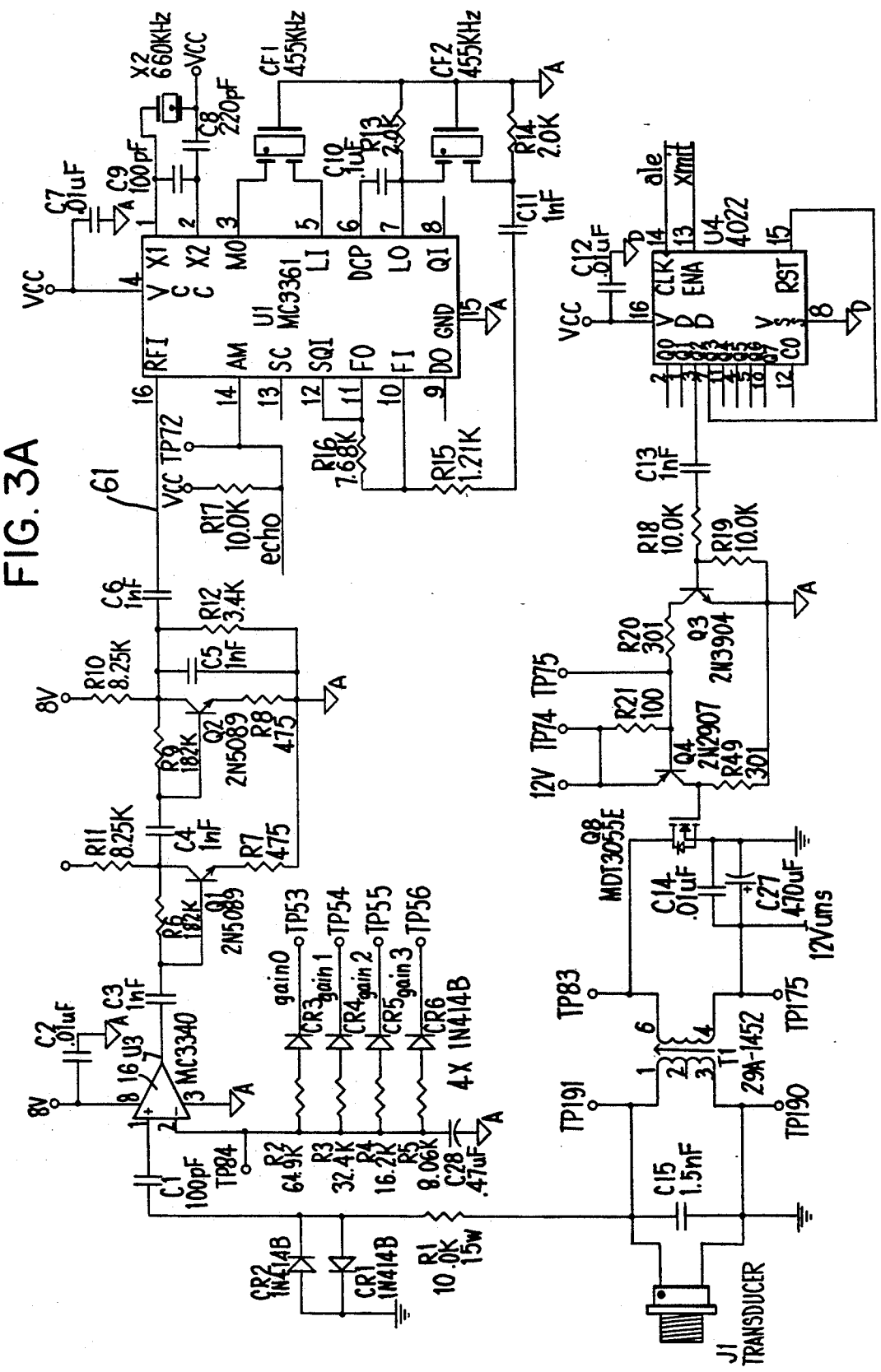
Figure 3B:
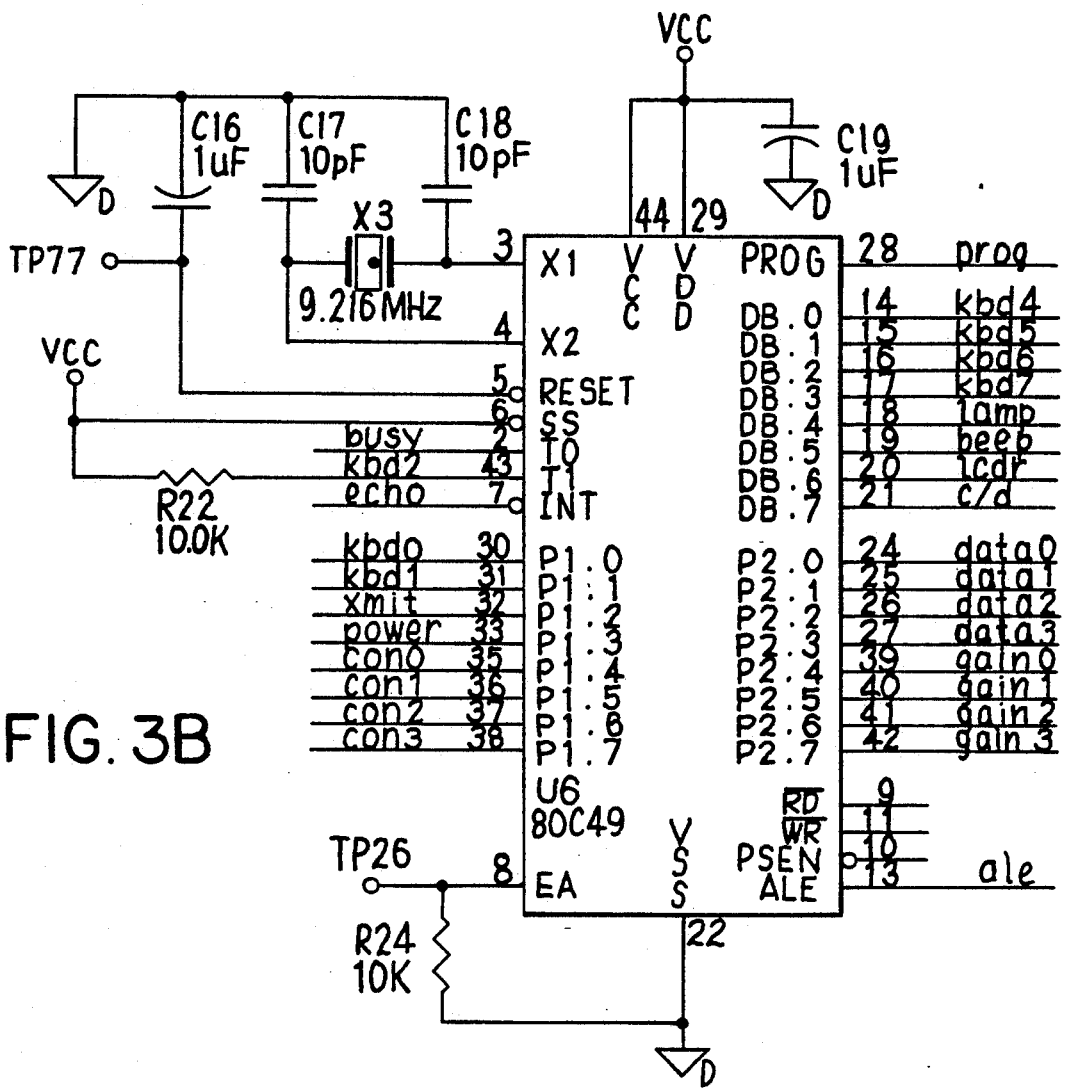
Figure 3C:
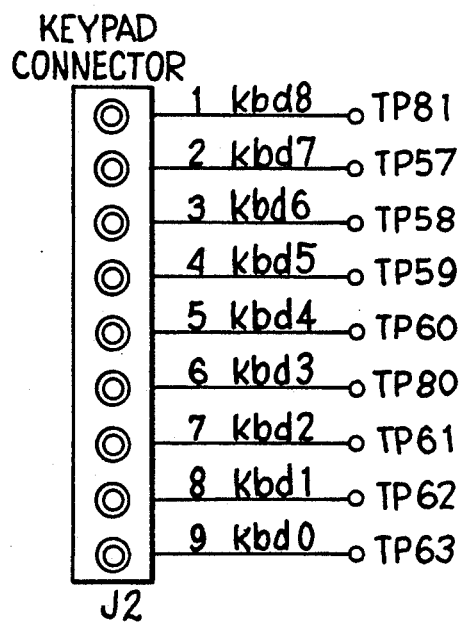
Figure 3E:
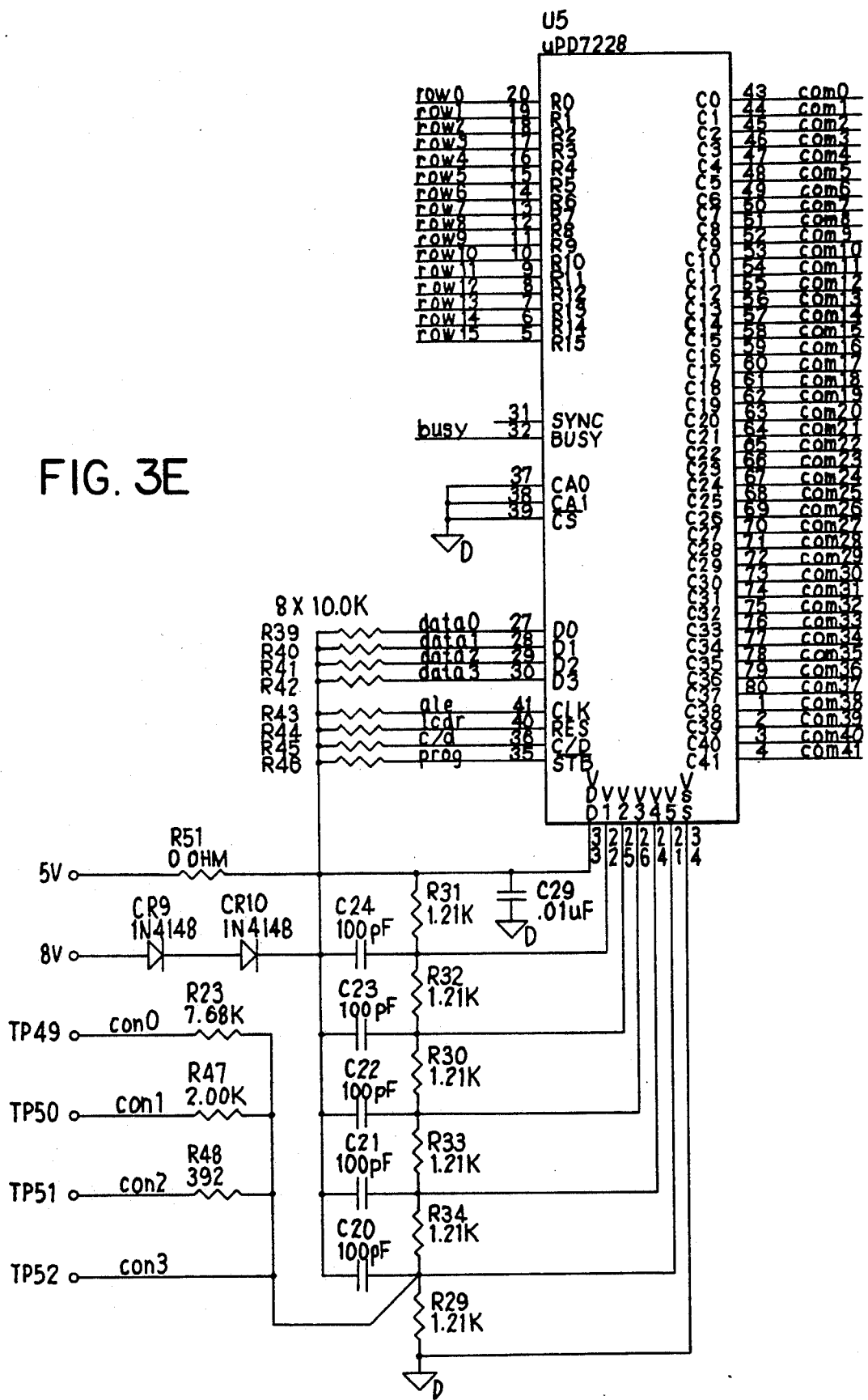

FIG. 3A includes an integrated circuit U4 which corresponds generally to the transmitter 48 in FIG. 1, a connector J1 which releasably couples the control circuit to the transducer 11, an integrated circuit U3 which corresponds generally to the variable gain amplifier 51 in FIG. 1, and an integrated circuit U1 which corresponds generally to the receiver 53 in FIG. 1. FIG. 3B includes an integrated circuit U6 which corresponds generally to the microprocessor or microcontroller shown at 36 in FIG. 1, FIG. 3C shows a connector which releasably couples the control circuit 12 to the keypad 14, and FIG. 3D shows two connectors which releasably couple the control circuit 12 to the LCD display 13. FIG. 3E includes an integrated circuit U5 which corresponds generally to the display driver circuit shown at 58 in FIG. 1, FIG. 3F shows a power regulation and distribution circuit within the control circuit 12 which is coupled by a connector J3 to the power source 16 of FIG. 1, and FIG. 3G includes a connector J5 into which the beeper 56 of FIG. 1 is plugged.

In the preferred embodiment, the integrated circuit U1 of FIG. 3A is an MC3361 low power FM receiver made by Motorola of Phoenix, Ariz., the integrated circuit U3 is an MC3340P electronic attenuator made by Motorola, and the integrated circuit U4 is an MC14022 component made by Motorola. In FIG. 3B, the integrated circuit U6 is an 80C49 single-component eight-bit microcontroller made by Intel Corporation of Santa Clara, Calif. In FIG. 3E, the integrated circuit U5 is an uPD7228 made by NEC of Mountain View, Calif. In FIG. 3F, the integrated circuit U2 is an MC78L08ACD low current positive voltage regulator made by Motorola, and the integrated circuit U7 is an LM340T5 positive voltage regulator made by Motorola.

In FIG. 3A, the integrated circuit U1 receives on line 61 the echo signals which have had their magnitudes or amplitudes normalized by the variable gain amplifier which includes the integrated circuit U3. These echo signals with normalized magnitudes are compared by the integrated circuit U1 to a predetermined threshold voltage, which in the preferred embodiment is defined by a resistor R16 connected between two inputs of the integrated circuit U1. In a conventional system, the resistor R16 is selected to have a value which produces a very low threshold voltage, typically just above the ambient background noise level, in order to maximize the sensitivity of the receiver and thus ensure that virtually every echo is accepted by the integrated circuit U1 and passed on to the microcontroller 36. While this is satisfactory in a traditional down-looking system, it is not satisfactory for a side-looking system. In particular, a side-looking system may receive echoes from a bottom surface which are weaker than but arrive before echoes from fish of interest. A conventional system with a low threshold value will pass all of these echoes on to the microcontroller. In order to minimize cost, the microcontroller does not receive magnitude information regarding accepted echoes, and thus it becomes difficult for the microcontroller to determine which accepted echoes are from fish are which are from other objects.

In this regard, the variable gain amplifier 51 can normalize an echo from a fish to compensate for the distance to the fish, but there are still other factors which produce variations in the normalized magnitudes of echoes received from fish, including the size of a given fish, the extent to which the fish is close to or offset radially from the center of the transmitted beam, and the orientation of the fish in the water (because a fish presents a larger reflection surface when it is sideways to the beam than when it is facing directly into the beam). The magnitude of an echo is often defined as its "target strength", which in general terms is a ratio of the magnitude of an echo to the magnitude of the transmitted signal which produced that echo. In somewhat more specific terms, the target strength TS in dB has been defined mathematically as:

$$TS = 10 \log\left(\frac{E}{I}\right)$$

where E is the echo intensity at one yard from the acoustic center of the target and I is the incident intensity. On a very specific level, target strength TS in dB for a reflection from the side of a fish has been expressed using the following empirically-derived equation:

$$TS = 19.1 \log L - 0.9 \log f - 54.3 + S$$

where L is the length of the fish in inches, f is the frequency in kilohertz, and S is a constant ranging from 1 dB for $L/\lambda = 1$ to 8 dB for $L/\lambda = 100$, $\lambda$ being the wavelength. Thus, for $L = 7$ inches and $f = 200$ KHz, $\lambda = 0.28$ and S is about 3 dB, so $TS = 16.141 - 1.8 - 54.3 + 3 = -36.96$ dB. In practice, different types of fish of a given size may produce echoes which vary by up to 5 dB in target strength from the value given by the second equation, due to factors such as the presence or absence of a swim bladder. For convenience, it is assumed here that each transmitted signal has substantially a constant magnitude, and that the magnitude of each echo corresponds directly to its target strength.

Echoes from fish of interest will normally lie within a range having a lower limit which, in essence, is the minimum normalized magnitude which will be recognized as an echo possibly representing a fish. A feature of the present invention involves setting the threshold magnitude used by the integrated circuit U1 to a value corresponding to this minimum magnitude, so that the integrated circuit U1 rejects all echoes having normalized magnitudes less than the threshold while accepting and passing to the microcontroller 36 all echoes having normalized magnitudes in excess of this minimum threshold. Thus, virtually all echoes from fish of interest will be accepted, but echoes having weaker normalized magnitudes, such as weak bottom surface echoes, will be rejected. This is significantly different from the traditional approach, in which the threshold used is minimal, and in particular is significantly less than the minimum normalized magnitude received from fish of interest and is also significantly less than the typical normalized magnitudes of echoes received from upwardly facing bottom surfaces disposed below a horizontally transmitted pulse. In the preferred embodiment, the appropriate threshold value has been achieved by using at R16 in FIG. 3A a 7.68K ohm resistor.

Figure 4:
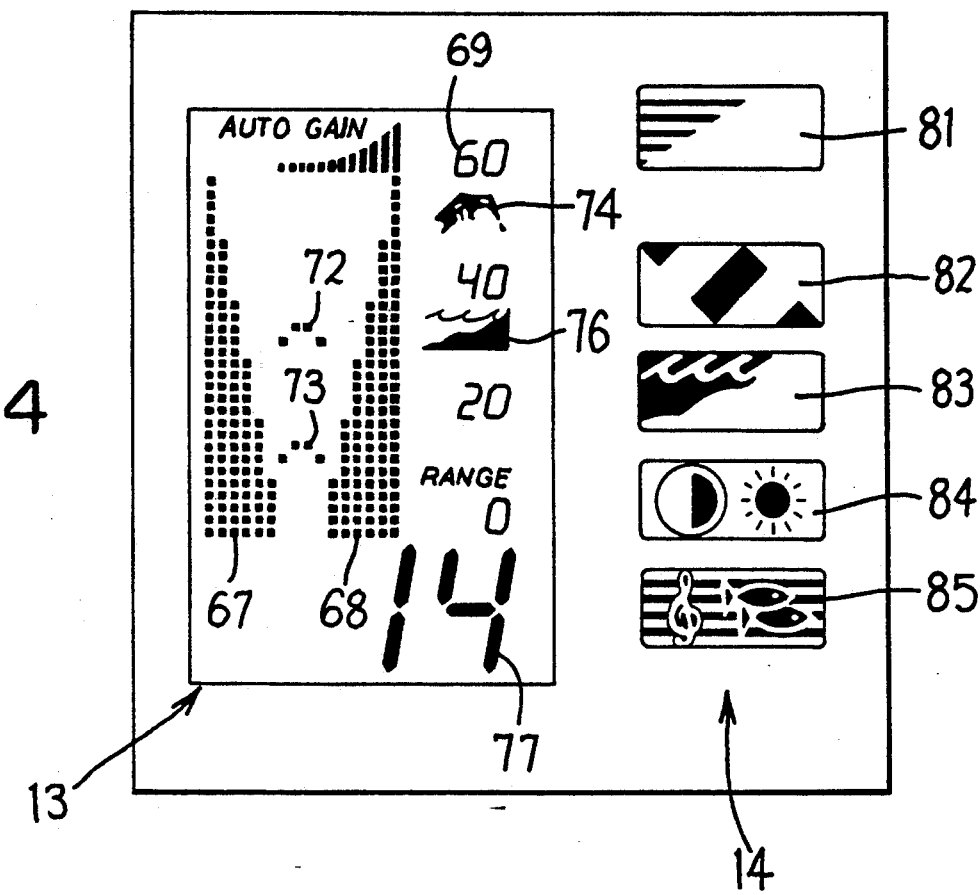
FIG. 4 is a diagrammatic view of a display which is a component of the apparatus of FIG. 1.

The LCD display 13 and the keypad 14 of FIG. 1 are both shown in more detail in FIG. 4. The display 13 is a liquid crystal component of conventional liquid crystal construction, and in the preferred embodiment is a component made by Ocular of Richardson, Tex. The display 13 has two spaced, parallel multi-dot stepped bars 67 and 68 which define between them a conical region representing the conical area in the water which the transducer 11 is monitoring, the lower end of the conical region representing the position of the transducer. To the right of the bars 67 and 68 is a scale 69 with four vertically spaced numbers, which represent distances in feet along the conical region from the transducer. The scale 69 in FIG. 4 includes the values 0/20/40/60, but other scales can be selected in a manner described later. The bottom of each digit in the scale is aligned with a respective step on the bars 67 and 68, and thus the step aligned with the digits 20 of the scale represents a distance of twenty feet from the transducer.

When a fish is detected, it is displayed diagrammatically in the form of a four-dot arc, examples of which are shown in FIG. 4 at 72 and 73. The vertical position of each four-dot arc represents the distance of the corresponding fish from the transducer 11.

The display includes a fish symbol 74 which is visible when the system is enabled to produce audible sounds through the beeper 56 (FIG. 1) in response to detection of a fish. The display also includes a shoreline symbol 76 which is visible when a filter feature is actuated. The display further includes large digits 77 indicating the distance to the nearest fish, which in FIG. 4 is the distance of fourteen feet to the nearest detected fish 73.

To the right of the display 13 in FIG. 4 is the keypad 14, which includes five manually operable, momentary push-button switches 81-85.

The switch 81 is a power switch. Pressing switch 81 turns on power to the fish finder system 10, and pressing switch 81 again turns off the power to the system.

Switch 82 is a range selection switch which selects the scale 69 used for display 13. The switch 82 is pressed and held to cause the system to successively display in a cyclic manner the available scales, and then the switch is released when the desired scale is displayed in order to select it. In the preferred embodiment, respective scales in feet of 0/5/10/15, 0/10/20/30, 0/20/40/60 and 0/40/80/120 are displayed in a cyclic manner.

The switch 83 is pressed to actuate a filtering function, in response to which the system causes the symbol 76 to become visible. The switch 83 is pressed again to deactuate the filtering function, which causes the symbol 76 to disappear. When the filter is on, the system is much more selective in identifying fish, which is particularly useful around docks and other underwater structures. The filter function is described in more detail later.

The switch 84 is used to vary the contrast of the display 13. This feature is not important for purposes of the present invention, and is therefore not described in detail.

The switch 85 is pressed to enable a fish alarm function, in response to which the system causes the symbol 74 in 1 display 13 to become visible. The switch 85 is pressed again to disable the fish alarm function, at which point the symbol 74 disappears. When the fish alarm is activated, the system 10 produces an audible chime when a fish is first detected following a period of time when no fish was detected, and so long as thereafter continuously detects at least one fish, the unit will beep once every 45 seconds.

In a traditional down-looking fish finding system, the bottom surface under the body of water usually produces a relatively large and direct upward reflection back to the transducer, and it is thus usually possible to easily identify the reflection caused by the bottom surface. It is assumed that there is little or nothing between the top surface and bottom surface except fish, and thus all echoes arriving before the echo from the bottom surface are treated as fish. In a side-looking system of the type to which the invention is directed, the situation is much more complex, because there is typically no identifiable echo from the bottom surface, and a variety of other objects such as weeds, support poles, retaining walls, sand bars and the like may produce echoes which arrive before echoes from fish. Accordingly, one feature of the present invention is an approach for differentiating echoes which are likely to be fish from echoes produced by other objects of the type just mentioned.

In general terms, according to the present invention, certain criteria must be met for an echo to be accepted. In particular, the echo must be proceeded by a leading non-echo or "space" time interval of a predetermined length in which no other echo occurs, and must be followed by a trailing nonecho or "space" interval in which no echo occurs. The length of the required leading space is approximately equal to or is greater than the length of the required trailing space. Further, the length of the echo signal itself, which is referred to as the "mark" interval, must have a length within a range bounded by upper and lower limits corresponding to the length of a typical echo from a fish. The typical echo from a fish is about 90% to 140% of the length of the transmitted sound pulse, because various reflective surfaces on the fish including the internal air bladder combine into a single echo. The upper limit of the range is lower when the filter controlled by switch 83 of FIG. 4 is on than when the filter is off, and the required minimum length of the trailing space interval is larger when the filter is on than when the filter is off, but in each case the required trailing space interval is approximately equal to or is less than the required leading space interval. It should be noted that if the space interval between two successive echoes is less than the required trailing space interval, both echoes will be rejected. If the interval between two successive echoes is greater than the required trailing space interval but less than the required leading space interval, the first echo will be accepted but the second will be rejected. This is one reason why the filter, which effectively increases the required trailing space interval relative to the required leading space interval, is very effective. The interval between two successive echoes must be greater than the required leading space interval in order for both echoes to be accepted, assuming the criteria relating to the length of the mark interval (echo length) is also met.

Figure 5:
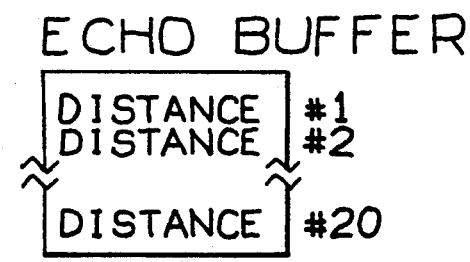
FIG. 5 is a diagrammatic representation of an echo buffer maintained by a central processing unit which is a component of the apparatus of FIG. 1.
Figure 6:
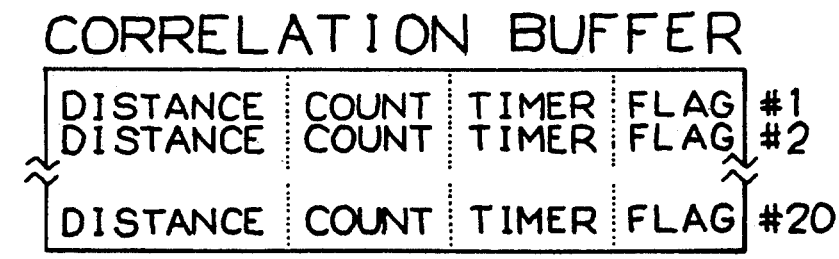
FIG. 6 is a diagrammatic representation of a correlation buffer maintained by the central processing unit of the apparatus of FIG. 1.
Figure 7A:
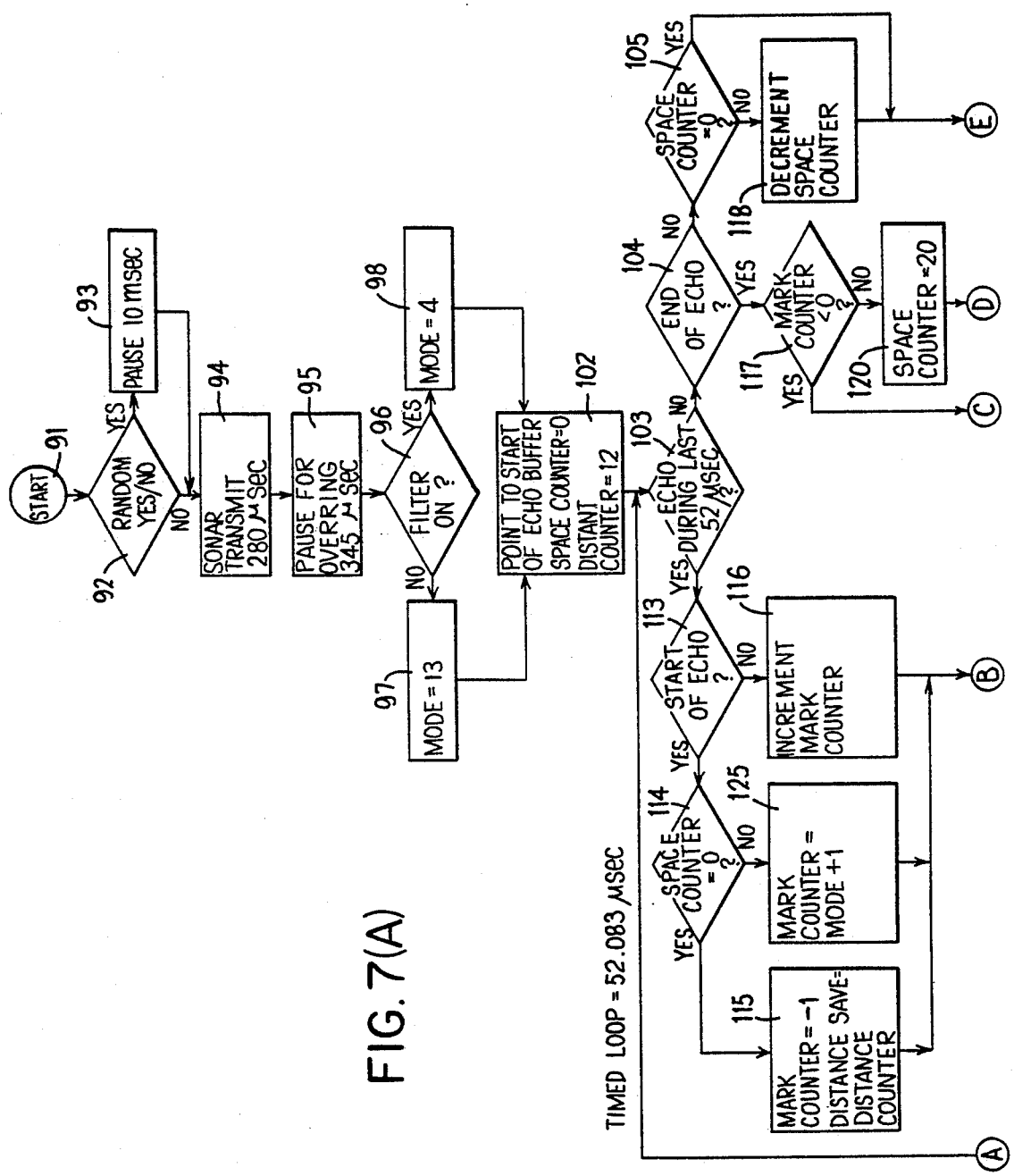
FIGS. 7(A), 7(B), 8, 9(A) and 9(B) are flowcharts depicting the operation of respective portions of a control program executed by the central processing unit of the apparatus of FIG. 1.
Figure 7:
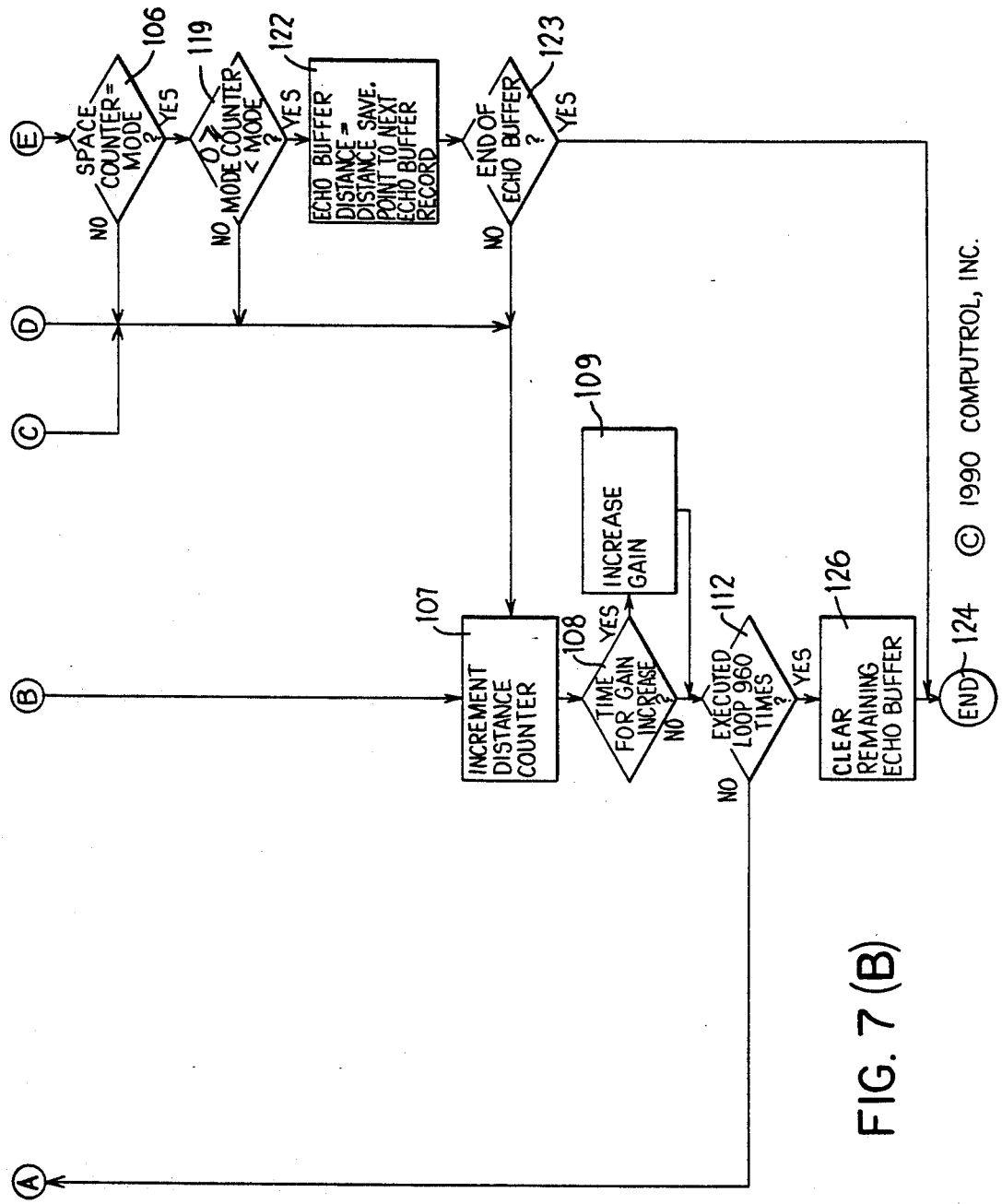
Figure 8:
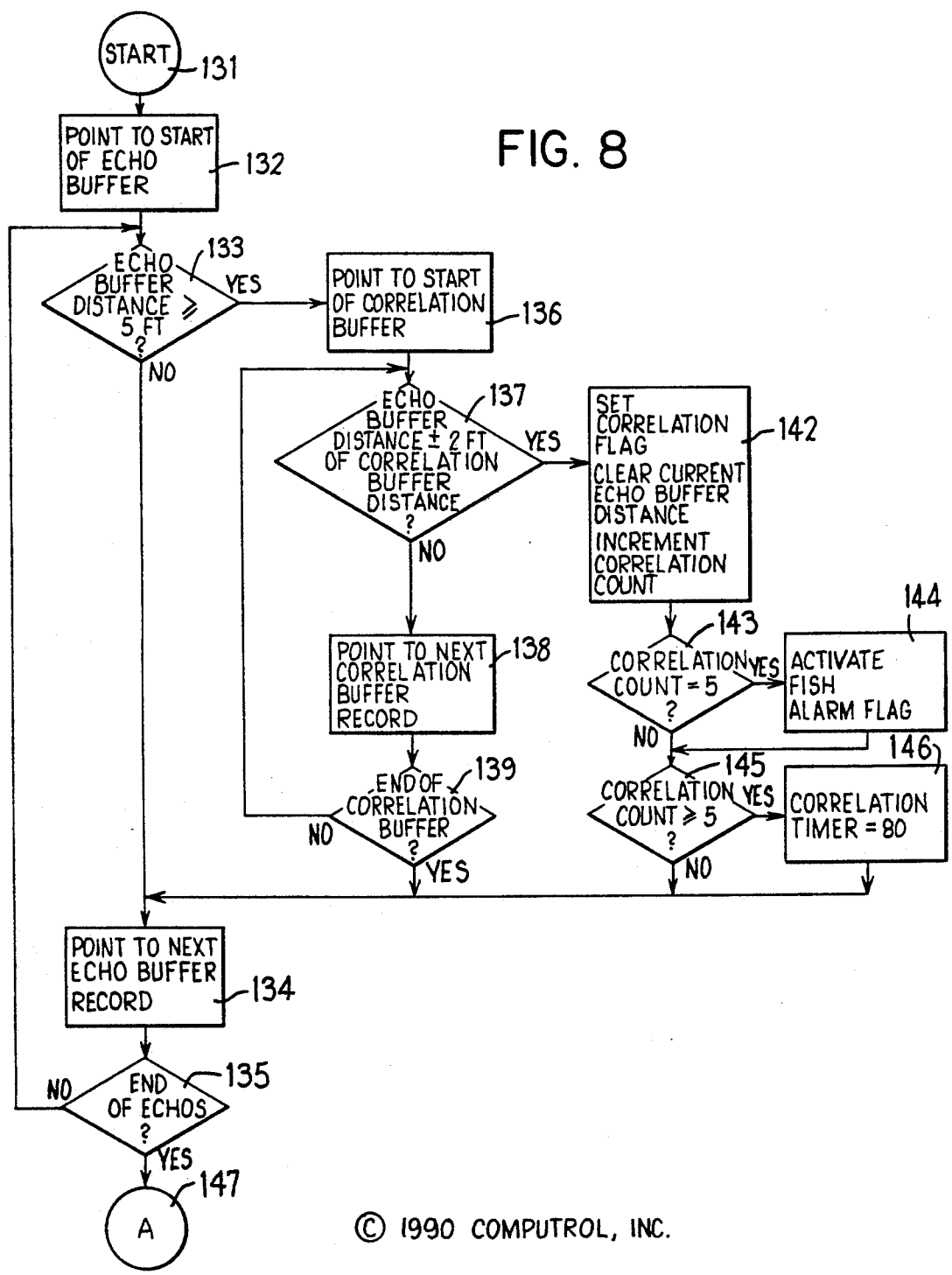
Figure 9A:
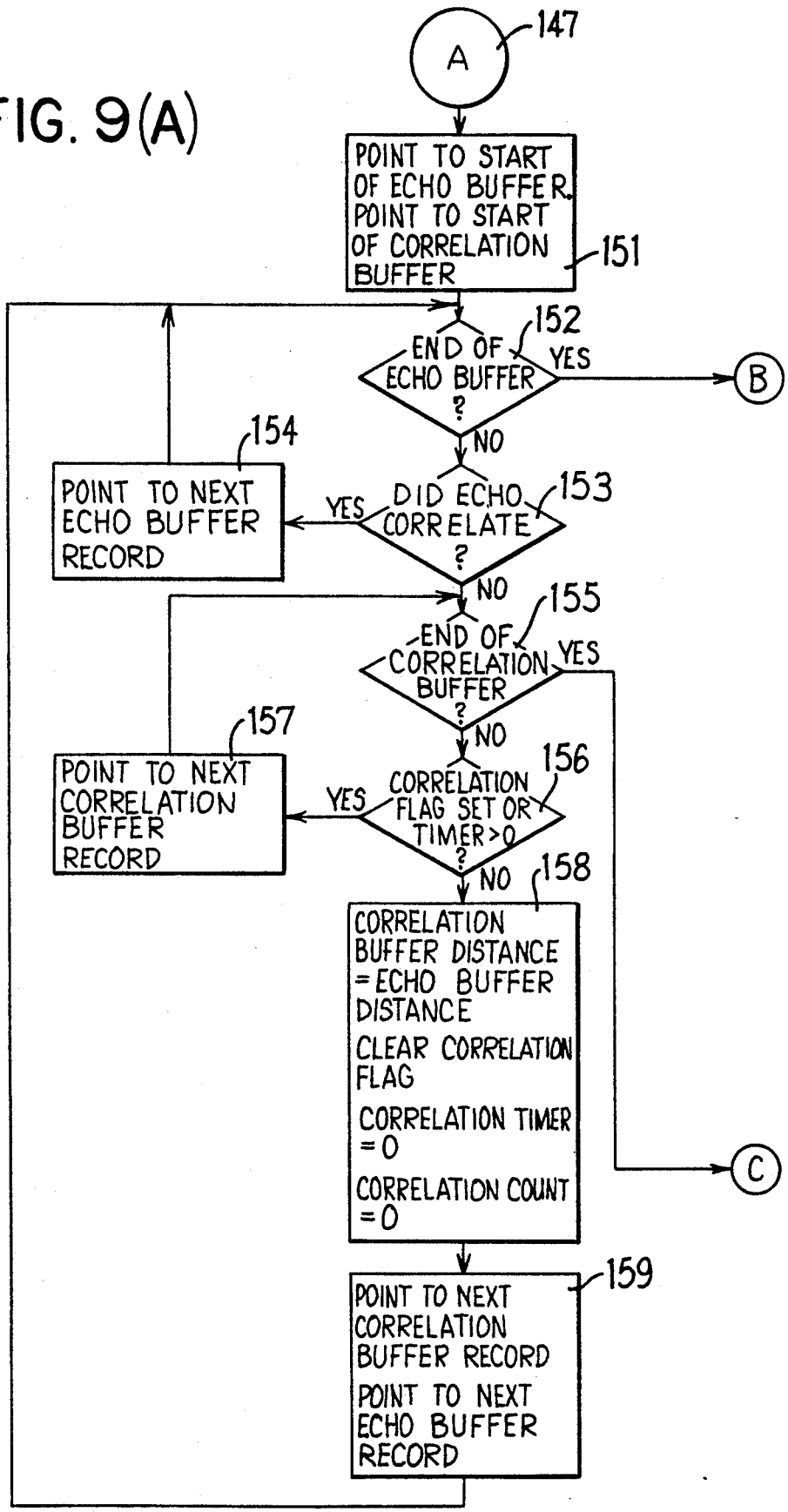
Figure 9B:
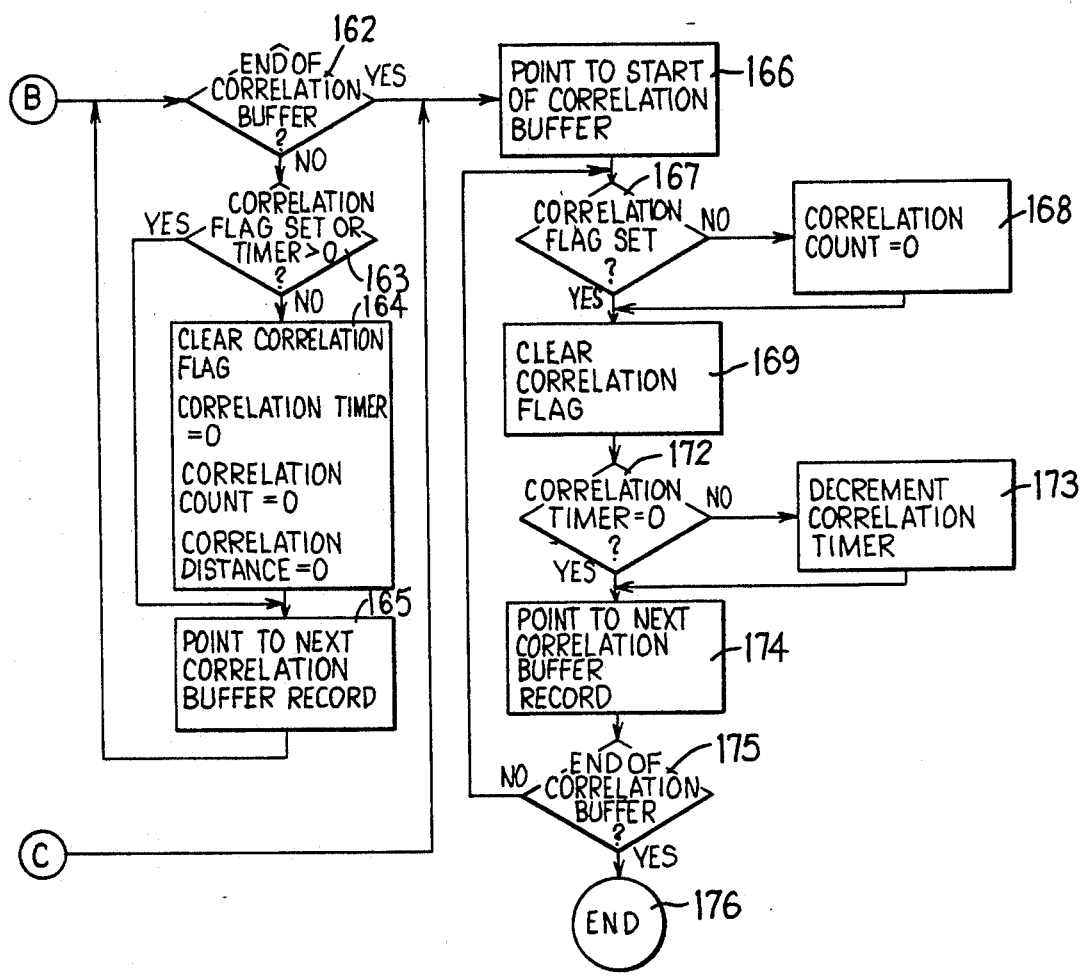

FIGS. 7-9 are flowcharts of portions of a program stored in the ROM 37 (FIG. 1) and executed by the microprocessor 36, in particular the portions of the program which relate to analysis of echoes by the microprocessor 36. FIGS. 7-9 do not show the entire program for the microprocessor 36, but only those portions necessary to an understanding of the present invention. FIG. 5 shows the format of an echo buffer maintained in the RAM 38 by the microprocessor 36, the echo buffer including 20 elements or records which each store a distance value. FIG. 6 shows the format of a correlation buffer maintained in the RAM 38 by the microprocessor 36, the correlation buffer having 20 elements or records which each store a correlation distance, a correlation count, a correlation timer and a correlation flag. It will be recognized that a larger or smaller number of records could be provided in either buffer.

The flowchart of FIG. 7 represents the routine which generates a sonar pulse and which then selects echoes that may be of interest and stores in the echo buffer of FIG. 5 for each selected echo a value which is the distance to the object which produced the echo. This routine is entered at 91 a predetermined time interval after an immediately proceeding sonar pulse was transmitted. At 92, a random determination is made regarding whether to carry out a ten msec delay or pause. If the delay is carried out, the transmission of the sonar pulse is delayed for ten msec. This ensures that, if two or more systems of the type shown in FIG. 1 are being operated in close proximity to each other in the same body of water, the transmission of sonar pulses by them is not likely to become synchronized in a manner which produces false readings in one or both units.

At block 94 the microprocessor transmits a 280 μsec sonar pulse using the transmitter 48 and transducer 11 of FIG. 1. Then, the microprocessor 36 pauses at 95 for 345 μsec, so that overring can dissipate. Then, at 96, the microprocessor 36 checks to see whether the filter switch 83 of FIG. 4 is actuated. If it is not, a variable MODE is set to a value of 13 at 97, whereas if the filter switch is actuated MODE is set to a value of 4 at 98. Then, at 102, a pointer for the echo buffer is set to the start of the buffer, a variable SPACE COUNTER is set to zero, and a variable DISTANCE COUNTER is set to 12.

From block 102, control passes to block 103, where a check is made to see whether any echo has been present during the last 52 μsec. Since at this point the system is still waiting for the first echo, it proceeds to block 104, where a check is made to see whether an echo has just ended. Since it has not, the system proceeds to block 105, where it checks to see whether the variable SPACE COUNTER is zero. Since it is, control proceeds to block 106, where a check is made to see whether the variable SPACE COUNTER equals the variable MODE. Since the variable SPACE COUNTER is zero and the variable MODE has a value of either 4 or 13, the condition is not met and control proceeds to block 107, where the variable DISTANCE COUNTER is incremented. Then, in block 108, the system checks to see whether it is time to increase the gain of the variable gain amplifier shown at 51 in FIG. 1, the gain being increased at periodic intervals. Thus, control is periodically transferred from block 108 to block 109, where a small increase is effected in the gain. Then, in block 112, a check is made to see whether the loop beginning in block 103 and ending in block 112 has been executed 960 times. The value 960 is that used in the preferred embodiment, but it will be recognized that this number can be varied. Since the loop has been executed only once, control proceeds back to block 103. This is a carefully timed loop which requires 52.083 μsec to execute. Since the speed of sound in water is 4800 feet per second, each execution of the loop represents a distance of three inches in sound travel (1.5 inches away from the transducer and 1.5 inches toward the transducer), and thus since the variable DISTANCE COUNTER is being incremented at 107 each time the loop is executed, this variable represents at each point in time when an echo is received the distance to the object which produced the echo.

The loop will be repeatedly executed in the manner just described until the start of the first echo is detected, at which point the system will determine in block 103 that an echo has been present and will proceed to block 113, where it will determine that it is the start of the echo and proceed to block 114. Since the variable SPACE COUNTER is still zero, the system will proceed to block 115, where it will set the variable MARK COUNTER to a negative 1 and will take the value in the variable DISTANCE COUNTER and save it in the variable DISTANCE SAVE. Then, execution proceeds through blocks 107, 108 and 112 to 103 and 113. It will be determined in block 113 that the echo is not just starting, and control will proceed to block 116 where the variable MARK COUNTER is incremented. The variable MARK COUNTER is used to measure the length of the echo. The system will continue to loop through blocks 103, 113, 116, 107, 108 and 112 until the echo signal terminates. When the echo signal terminates, the system will determine in block 103 that the echo has terminated and will proceed to block 104, where it will determine that the echo has just ended and will proceed to block 117, in which it checks the variable MARK COUNTER to see if it is less than zero. If it is, then the variable MARK COUNTER set at 115 to negative 1 was never incremented at 116, which means that the echo was not really a true echo from the sonar pulse, but was a spurious noise pulse having a duration less than the 52.083 μsec interval required to execute the loop. Such a spurious noise pulse might, for example, be caused by a mechanical sound produced by another boat or motor. Consequently, the next step at 120 is skipped so that the SPACE COUNTER is not changed and remains at zero. This ensures that the spurious pulse is ignored, in a manner discussed later. Typically, the echo will be sufficiently long so that the MARK COUNTER is incremented at 116 at least once, in which case the MARK COUNTER will be positive at 117 and control will proceed to 120 where the variable SPACE COUNTER is set to 20. The variable SPACE COUNTER is then used to simultaneously check both the trailing space interval of the current echo as well as the leading space interval of the next successive echo, as described below.

In the next iteration of the loop, control will proceed from block 103 to block 104, where it will be determined that the end of the echo has already been detected and thus control will be transferred to block 105. Since the variable SPACE COUNTER is not zero, control will proceed to block 118, where the variable SPACE COUNTER is decremented. Then, control proceeds to block 106, where it will be determined that the variable SPACE COUNTER does not yet equal the variable MODE, and control will proceed to block 107. The system will loop in the manner just described several times, namely through blocks 103, 104, 105, 118, 106, 107, 108 and 112. At some point, the variable SPACE COUNTER will have been decremented to equal the variable MODE, which has a value of 4 or 13. This means that the criteria for the required trailing space interval has been met, and control will proceed to block 119, where a check is made to see whether the variable MARK COUNTER is greater than or equal to a lower limit of zero and less than an upper limit defined by the variable MODE. Thus, since the length of the variable MARK COUNTER corresponds to the length of the echo, block 119 is checking to see whether the length of the echo is within a range corresponding to the lengths of typical echoes produced by fish. If it is, then all criteria for accepting the echo have been met, and control proceeds to block 122, where the distance saved at the start of the echo in the variable DISTANCE SAVE is stored in the current record of the echo buffer of FIG. 5, and the next record in the echo buffer is selected by incrementing the pointer to the echo buffer. Then, control proceeds to block 123 where a check is made to see if the end of the echo buffer has been reached because the echo buffer is full of echoes, in which case no further echoes can be accepted and the routine terminates at block 124. This would be unusual, and thus control normally proceeds from block 123 to block 107.

At this point, the variable SPACE COUNTER has been decremented to the value of MODE, which is 4 or 13. In order for the required leading space interval to be present before the next echo starts, the variable SPACE COUNTER must be decremented to zero before the start of the next echo is detected. Thus, the loop should be executed another four or thirteen times through blocks 103, 104, 105, 118, 106, 107, 108 and 112. Once the variable SPACE COUNTER has reached zero, the required leading space interval has elapsed and the system is ready to receive a subsequent echo.

In the event a subsequent echo starts too early, in particular before the variable SPACE COUNTER has been decremented to zero, control will proceed through blocks 103, 113 and 114 to block 125, where the variable MARK COUNTER will be set to a value which is one higher than the value in the variable MODE, or in other words a value of 5 or 14 when MODE is respectively 4 or 13. Since the variable MARK COUNTER is always incremented and never decremented, this ensures that the variable MARK COUNTER is always above the upper limit of the range checked at block 119. In other words, the actual length of the echo is ignored, and the measured length is forcibly set to a large value which ensures the echo will later be rejected at 119. If block 125 is executed before the variable SPACE COUNTER has been decremented to equal the variable MODE, then the large value forced into the variable MARK COUNTER will cause both of the echoes to be rejected, because the check made at block 119 cannot find the variable MARK COUNTER to be within the required range for either echo. This represents the condition where the time interval between the two echoes is less than the required leading space interval and also less than the required trailing space interval. On the other hand, if the variable SPACE COUNTER is decremented to the value of the variable MODE and thus blocks 119 and 122 have both been executed for the first echo before the block 125 is executed for the start of the second echo, the first echo will be accepted but the second echo will be rejected, because the value of the variable MARK COUNTER for the second echo will necessarily be too large to satisfy the check at block 119 for the second echo This represents the condition where the time interval between the two echoes is less than the required leading space interval but greater than the required trailing space interval.

If in the manner described above it is determined at 117 that the MARK COUNTER is negative and thus block 120 is skipped, which means a spurious noise pulse has occurred, the SPACE COUNTER remains at zero. Thus, the condition at 119 will never be met for the spurious noise pulse, and it will necessarily be rejected. Further, since the SPACE COUNTER remains at zero, if a valid echo begins shortly after the spurious noise pulse, it will be determined at 114 that the SPACE COUNTER is zero, and thus the system will proceed to 115 to begin accepting the echo as valid. On the other hand, if block 120 had not been skipped, the SPACE COUNTER would have been set to 20 at 120 as a result of the noise pulse, and would not have reached zero when the system checked it at 114, and thus the system would have proceeded to 125 in order to reject the valid echo as being too close in time to the end of a prior echo, the prior echo in fact being nothing more than the noise pulse.

If a noise pulse occurs shortly after an echo, namely while the trailing space interval for that echo is being checked, the SPACE COUNTER will be greater than zero when the noise pulse causes it to be checked at 114, and thus control will proceed to block 125 where the MARK COUNTER is set to a value which will cause both the noise pulse and the echo preceding it to subsequently be rejected.

When the loop has been executed 960 times, control will proceed from block 112 to block 126, where any unused locations at the end of the echo buffer of FIG. 5 will be cleared in order to indicate that they do not contain data for received echoes. Then, the routine terminates at 124.

Before the system determines that a fish has been detected, an acceptable echo from substantially the same location in the water must be received in response to each of five successive sonar pulses. This requirement screens out spurious echoes which may occur from time to time, and is referred to as a "correlation" of successive echoes. Only when an echo correlates for five successive sonar pulses is an arcuate symbol representing a fish displayed on the display 13 in the manner indicated at 72 or 73 in FIG. 4. So long as an acceptable echo is received from substantially the same location in the water in response to each successive sonar pulse thereafter, the system continues to display the arcuate symbol 72 or 73 representing the fish. When at some point an acceptable echo is not received from that location in response to any single sonar pulse, the system clears the internal indication that a fish has been detected, but continues to show the arcuate symbol at 72 or 73 on the display for five seconds thereafter. The purpose of the five second delay in erasing the symbol is to ensure that, when the operator hears an audible beep indicating that a fish has been detected, the operator has time to turn his or her head and look over at the displayed symbol 72 or 73 before it disappears.

FIGS. 8 and 9 are a flowchart of a routine in which echo data collected in response to a single sonar pulse is correlated with echo data from prior sonar pulses in order to determine if one or more fish symbols should be presented on the display 13. The portion of the routine shown in FIG. 8 basically involves the identification of echoes from the most recent sonar pulse which do correlate with echoes from prior pulses, whereas FIG. 9 processes data for echoes from the most recent sonar pulse which do not correlate with echo data from prior pulses.

The routine of FIG. 8 starts at block 131, and proceeds to block 132, where a pointer is set to the start of the echo buffer of FIG. 5. Then, in 133, a check is made to see whether the distance value in the current record of the echo buffer is at least five feet, because the preferred embodiment automatically rejects any echo from an object less than five feet away from the transducer. If the record does not contain a distance of at least five feet, the pointer is moved to the next echo buffer record at 134, and a check is made at 135 to see if the entire echo buffer has been processed. If not, control returns to block 133. When the distance value in the echo buffer is determined at 133 to be at least five feet, control proceeds to block 136, where a pointer is set to the start of the correlation buffer shown in FIG. 6. Each active record in the correlation buffer of FIG. 6 represents one or more echoes detected at a particular location in response to one or more prior sonar pulses. Each record in the correlation buffer includes a distance value representing the distance to the object which produced each such correlating echo, a count of the number of successive times an acceptable echo has been received from substantially that distance, a timer value which causes a fish symbol 72 or 73 (FIG. 4) to continue to be displayed for at least five seconds after an acceptable echo is not received from the appropriate distance, and a correlation flag which is used to provide a temporary indication of whether that record in the correlation buffer correlated with any distance in the echo buffer during current processing of a given echo buffer.

Control proceeds from block 136 to block 137, where a check is made to see whether the distance in the currently selected record of the echo buffer is within two feet in either direction of the distance specified in the current record of the correlation buffer. If it is not, then the next correlation buffer record is selected at 138, and at block 139 control is returned to block 137 unless the end of the correlation buffer has been reached, in which case control proceeds to block 134. If at some point it is determined in block 137 that the distance in the current echo buffer record is within two feet of the distance in the current correlation buffer record, control proceeds to block 142, where the correlation flag is set in the current correlation buffer record in order to indicate that the echo buffer contained an echo correlating to prior echoes represented by the current correlation buffer record, where the distance value in the current record of the echo buffer is cleared (zeroed) so that it will not later be treated as an echo for which no correlation occurred, and where the correlation count in the current record of the correlation buffer is incremented in order to indicate that an additional successive echo correlation has occurred within two feet of the distance set forth in the current correlation buffer record. Control then proceeds to block 143, where a check is made to see if the correlation count has reached the required value of five. If the count has reached a value of five, then the system concludes a fish is present at that location and control proceeds to block 144, where a fish alarm flag is activated. Then, in block 145, if the correlation count is greater than or equal to five, control proceeds to block 146, where the correlation timer in the current correlation buffer location is set to a value of 80, which represents a time period of five seconds. Control then returns to block 134. When each record of the echo buffer containing echo data has been checked for correlation with the active records in the correlation buffer, control proceeds from block 135 to the routine of FIG. 9 through block 147.

In a subsequent, not-illustrated routine, if the fish alarm flag is set and if the fish alarm control switch 85 (FIG. 4) is actuated, the microprocessor 36 will cause the beeper 56 to beep and to thereafter beep each time a fish is detected so long as the system is continuously detecting at least one valid fish, and provided that no beeps have occurred within the preceding 45 seconds. Also, in the same not-illustrated routine, the fact that the correlation timer for the current correlation buffer record has been set to a non-zero value will cause the microprocessor to present on the display 13 an arcuate symbol similar to that shown at 72 and 73 in FIG. 4, the location of the symbol corresponding to the distance specified in that record of the correlation buffer, and the symbol being displayed so long as the correlation timer has a value greater than zero.

Turning to FIG. 9, the illustrated routine essentially takes data remaining in the echo buffer, namely data which did not correlate with any record of the correlation buffer, and inserts this data into unused records of the correlation buffer. The routine also does some housekeeping for the records in the correlation buffer.

More specifically, following entry at block 147, control proceeds to block 151, where a pointer is set to the start of the echo buffer and a pointer is set to the start of the correlation buffer. Then, in block 152, a check is made to see if the end of the echo buffer has been reached. If it has not, then a check is made at 153 to see if the current record of the echo buffer contains a value greater than zero, or in other words an echo distance which did not correlate with a record of the correlation buffer during the processing represented by the flowchart of FIG. 8. If the location does not contain a value greater than zero, then control proceeds to 154 where the echo buffer pointer is moved to the next record, nd control returns to block 152. The system thus loops through blocks 152, 153 and 154 until an echo buffer record containing a non-zero distance value is found.

If a non-zero distance value is found in an echo buffer record, control proceeds to block 155, where a check is made to see if the end of the correlation buffer has been reached. If it has not, control proceeds to block 156, where a check is made to see if, in the current record of the correlation buffer, the correlation flag is set or the correlation timer as a value greater than zero. The occurrence of either of these conditions is an indication that the current record of he correlation buffer is already in use, and so control proceeds to block 157, where the correlation buffer pointer is advanced to the next record of the correlation buffer, and hen control returns to block 155. The system thus loops through blocks 155, 156 and 157 looking for an unused correlation buffer record.

When it finds an unused correlation buffer record, it proceeds from block 156 to block 158, where it initializes hat record of the correlation buffer by transferring the distance from the current echo buffer record to the correlation buffer record, and by clearing the correlation flag, correlation timer and correlation count in that correlation buffer record. Then, at block 159, the pointers for the correlation buffer and echo buffer are each advanced to the ext records therein, and control is returned to block 152. Thus, to the extent that the correlation buffer has unused records, echo data in the echo buffer which did not correlation with any prior echo represented in the correlation buffer is transferred to unused records in the correlation buffer so that future checks can be made for correlation therewith.

If at block 152 it is determined that the end of the echo buffer has been reached, control proceeds to block 162, here a check is made to see if the end of the correlation buffer has been reached. If it has not, then at 163 a check is made to see if, in the current correlation buffer record, the correlation flag is set or the correlation timer is greater than zero. The presence of either these conditions indicates that the current correlation buffer record is active, and thus the next block 164 is skipped. On the other and, if the current correlation buffer record is not active, the data in it should be discarded, and thus at block 164 the correlation flag, correlation timer, correlation count and correlation distance of the record are all cleared. Then, at block 165, the correlation buffer pointer is moved to the next correlation buffer record, and control returns to block 162. Thus, the system loops through blocks 162, 163, 164 and 165 looking for unused correlation buffer records containing obsolete data, and clearing those records.

When the end of the correlation buffer is reached, either at block 155 or block 162, control proceeds to block 166, where the system sets the correlation buffer pointer back 50 to the beginning of the correlation buffer. Then, at 167, the system checks to see if the correlation flag is set, or in other words whether any echo data from the most recent sonar pulse correlated with the echo data in the current record of he correlation buffer. If the flag is not set, then the correlation count is cleared at 168 in order to restart the check for five successive correlating echoes. Then, at block 169, the correlation flag is cleared in preparation for the ext time the routine of FIGS. 8 and 9 is executed. Then, at block 172, a check is made to see if the correlation timer is set to a value of zero. If not, then at 173 the correlation timer is decremented. So long as the timer has a non-zero value, a not-illustrated routine displays a fish symbol similar to that shown at 72 or 72 in FIG. 4, and the correlation timer ensures that the symbol continues to be displayed for five seconds after there is a termination in successive correlating echoes.

Thereafter, at block 174, the system moves the correlation buffer pointer to the next record of the correlation buffer, and then checks at 175 to see if the entire correlation buffer has been processed. If not, the system loops through blocks 167-175 until each record has been processed. Then, control proceeds from block 175 to 176 and the routine terminates.

As mentioned above, the flowcharts of FIGS. 7-9 do not show all of the processing carried out by the microprocessor of FIG. 1, but only the portions of the processing which are pertinent to an understanding of the present invention.

Although a single preferred embodiment of the invention has been disclosed in detail for illustrative purposes, it will be recognized that there are variations and modifications thereof which lie within the scope of the present invention.

The routines depicted in FIGS. 7-9 are periodically executed, so that there is cyclic repetition of the steps of transmitting a sound pulse, detecting echo characteristics, rejecting echoes with characteristics which do not meet specified criteria, and accepting echoes which do meet the criteria.

The embodiments of the invention in which an exclusive property or privilege is claimed are defined as follows:

1. A method of detecting fish in a body of water, comprising the steps of: transmitting a sound pulse through the water in a predetermined direction, thereafter detecting echoes from said sound pulse which are each preceded by a leading space interval free of other echoes and followed by a trailing space interval free of other echoes, rejecting each said detected echo which has a duration falling outside a predetermined range bounded by an upper limit and a lower limit, accepting said detected echoes other than said detected echoes rejected in said rejecting step, and interpreting each said accepted echo to be an echo from a fish.

2. A method of claim 1, wherein said rejecting step includes the step of rejecting each said detected echo for which said trailing space interval is less than a first predetermined time duration.

3. A method of claim 2, wherein said rejecting step includes the step of rejecting each said detected echo for which said leading space interval is less than a second predetermined time duration, said second predetermined time duration being greater than said first predetermined time duration.

4. A method of detecting fish in a body of water, comprising the steps of: transmitting a sound pulse through the water in a predetermined direction, thereafter detecting echoes from said sound pulse which are each preceded by a leading space interval free of other echoes and followed by a trailing space interval free of other echoes, rejecting each said detected echo for which said trailing space interval is less than a predetermined trailing time duration.

5. A method of claim 4, wherein said rejecting step includes the step of rejecting each said detected echo having a time duration which is outside of a predetermined range bounded by upper and lower limits.

6. A method of claim 5, including the steps of setting the difference between said upper and lower limits to first and second values in response to the presence and absence of a predetermined condition, and setting said trailing time duration respectively to third and fourth values in response to the presence and absence of said predetermined condition, said first value being less than said second value and said third value being greater than said fourth value.

7. A method of claim 6, including the step of detecting the status of said predetermined condition by testing a manually actuable filter switch, said predetermined condition being present and absent when said switch is respectively actuated and deactuated.

8. A method of claim 5, wherein said rejecting step includes the step of rejecting each said detected echo for which said leading space interval is less than a predetermined leading time duration, said leading time duration being greater than said trailing time duration.

9. A method of claim 8, including the steps of initializing a mark counter to a predetermined mark value at the start of each echo, incrementing said mark counter at predetermined time intervals during the echo, setting a space counter to a predetermined value when the echo ends, decrementing said space counter at predetermined intervals thereafter, and accepting the echo if said space counter is decremented to a first space value before the start of the next successive echo and said mark counter is within said range, said mark value being respectively below said lower limit and above said upper limit when said space counter respectively has at the time of said step of initializing said mark counter a second space value and a value greater than said second space value.

10. A method of claim 4, including the steps of maintaining an echo buffer having a plurality of records, and saving in a respective said record of said echo buffer for each said accepted echo a value representing a distance to the fish which produced the echo.

11. A method of claim 10, including the steps of maintaining a correlation buffer having a plurality of records which each include a distance value and a count value, comparing each said distance value in said echo buffer to said distance values in said correlation buffer, incrementing the correlation count in each of said records in said correlation buffer for which the distance value therein differs from one of said distance values in said echo buffer by less than a predetermined amount, zeroing the correlation count in each of said records in said correlation buffer for which the distance value therein differs from each of said distance values in said echo buffer by more than said predetermined amount, and providing an operator perceptible indication that a fish has been detected when one of said correlation counts is greater than four.

12. A method of claim 11, including the steps of maintaining in each said correlation buffer location a correlation timer, setting said correlation timer to a predetermined positive value when said correlation count has a value greater than four, and periodically decrementing said correlation time when said correlation count has a value less than five, said step of providing said operator perceptible indication being carried out by maintaining said operator perceptible indication so long as said correlation time has a value greater than zero.

13. A method of detecting objects in a body of water, comprising the steps of periodically transmitting a pulse of sound in a predetermined direction and thereafter monitoring echoes of the sound reflected from objects in the water, and substantially randomly varying the length of a time interval between successive said transmitting steps.

14. A method of claim 13, wherein said randomly varying step is carried out by substantially randomly selecting between each pair of successive said transmitting steps one of a first predetermined time interval and a second predetermined time interval different from said first predetermined time interval, and spacing said pair of successive transmitting steps by said selected one of said first and second predetermined time intervals.

15. A method of claim 14, wherein said substantially randomly varying step is carried out by the steps of determining on a substantially random basis immediately prior to each said transmitting step whether to carry out a predetermined time delay which is equal to the difference between said first and second predetermined time intervals, and delaying for a time interval equal to said difference in response to a determination to carry out the delay.

16. A method of claim 15, wherein said difference between said first and second predetermined time intervals is 10 msec.

17. A method of claim 4 including, after said transmitting step and prior to said detecting step, the steps of normalizing magnitudes of said echoes from said sound pulse based on distances travelled through the water, comparing the normalized magnitude of each said echo to a reference magnitude which is a minimum normalized magnitude produced by a fish of interest, and rejecting echoes having normalized magnitudes below said reference magnitude.

18. A method of claim 17, wherein said reference magnitude, with respect to the magnitude of said sound pulse, has a value of $-36.96 \pm 5$ dB.

19. A method of detecting fish in a body of water, comprising the steps of: emitting a sound pulse into said body of water, detecting echoes from said sound pulse and normalizing magnitudes thereof based on distances traveled through the water, comparing the normalized magnitude of each said echo to a reference magnitude which is a minimum normalized magnitude produced by a fish of interest, rejecting echoes having normalized magnitudes below said reference magnitude, and accepting other echoes; wherein said emitting step includes the step of directing said sound pulse in an approximately horizontal direction; and wherein an approximately horizontally extending bottom surface below said body of water produces an echo which, after said normalizing step, has a normalized magnitude which is less than said reference magnitude.

20. A method of detecting fish in a body of water, comprising the steps of: periodically transmitting a sound pulse through the water in a predetermined direction; thereafter detecting echoes from said sound pulse and normalizing magnitudes thereof based on distances traveled through the water; thereafter selecting echoes which have normalized magnitudes above a reference magnitude equal to a minimum normalized magnitude produced by a fish of interest and which are each preceded by a leading space interval free of other echoes and followed by a trailing space interval free of other echoes; rejecting each said selected echo which has a duration falling outside a predetermined range bounded by an upper limit and a lower limit, said rejecting step including the steps of rejecting each said selected echo for which said trailing space interval is less than a first predetermined time duration and rejecting each said selected echo for which said leading space interval is less that a second predetermined time duration, said second predetermined time duration being greater than said first predetermined time duration; accepting said selected echoes other than said selected echoes rejected in said rejecting step; maintaining an echo buffer having a plurality of records, and saving in a respective said record of said echo buffer for each said accepted echo a value representing a distance to an object which produced the echo; maintaining a correlation buffer having a plurality of records which each include a distance value and a count value; comparing each said distance value in said echo buffer to said distance values in said correlation buffer; incrementing the correlation count in each of said records in said correlation buffer for which the distance value therein differs form one of said distance values in said echo buffer by less than a predetermined amount; zeroing the correlation count in each of said records in said correlation buffer for which the distance value therein differs from each of said distance values in said echo buffer by more than said predetermined amount; and producing an operator perceptible indication that a fish has been detected when one of said correlation counts is greater than a predetermined value.

21. A method of claim 20, including the step of substantially randomly varying the length of a time interval between successive said transmitting steps.

22. A method of claim 4, wherein said rejecting step includes the step of rejecting each said detected echo for which said leading step interval is less than a predetermined leading time duration.

23. A method of claim 22, wherein said leading time duration is approximately equal to said trailing time duration.

24. A method of claim 4, including the steps of cyclically repeating the transmitting, detecting and rejecting steps, maintaining a count of the number of times successive said sound pulses produce substantially equivalent echoes which are not rejected during said rejecting step, and providing an operator perceptible indication of a fish when said count exceeds a predetermined count value.

25. A method of claim 24, wherein said predetermined count value is four, whereby said indication of a fish is provided upon receipt of the last of five substantially equivalent echoes from five of said sound pulses which are successive.

26. A method of claim 24, wherein said step of providing said indication of said fish includes the step of continuing to provide said indication of said fish until a predetermined delay interval after detection of a predetermined condition, and terminating said operator perceptible indication of said fish at the end of said predetermined delay interval.

27. A method of claim 26, wherein said predetermined delay interval is approximately five seconds.

28. A method of claim 26, wherein said predetermined condition includes the absence of a predetermined number of said substantially equivalent echoes.

29. A method of claim 24, including the step of producing an audible sound in association with said step of providing said operator perceptible indication of a fish.

30. A method of detecting fish in a body of water, comprising the steps of: transmitting a sound pulse through the water in a predetermined direction, thereafter detecting echoes from said sound pulse which are each preceded by a leading space interval free of other echoes and followed by a trailing space interval free of other echoes, and rejecting each said detected echo for which said leading space interval is less than a predetermined leading time duration.

31. A method of claim 30, including the steps of cyclically repeating said transmitting, detecting and rejecting steps, maintaining a count of the number of times successive said sound pulses produce substantially equivalent echoes which are not rejected during said rejecting step, and providing an operator perceptible indication of a fish when said count exceeds a predetermined count value.

32. A method of claim 31, wherein said predetermined count value is four, whereby said indication of a fish is provided upon receipt of the last of five substantially equivalent echoes from five of said sound pulses which are successive.

33. A method of claim 31, wherein said step of providing said indication of said fish includes the step of continuing to provide said indication of said fish until a predetermined delay interval after detection of a predetermined condition, and terminating said operator perceptible indication of said fish at the end of said predetermined delay interval.

34. A method of claim 33, wherein said predetermined delay interval is approximately five seconds.

35. A method of claim 33, wherein said predetermined condition includes the absence of a predetermined number of echoes substantially equivalent to said substantially equivalent echoes.

36. A method of claim 33, including the step of producing an audible sound in association with said step of providing said operator perceptible indication of a fish.

37. A method of detecting fish in a body of water, comprising the steps of: transmitting a sound pulse through the water in a predetermined direction, thereafter detecting echoes from said sound pulse which are preceded by a leading space interval free of other echoes and followed by a trailing space interval free of other echoes, rejecting each said detected echo which has a duration greater than a predetermined upper limit, accepting said detected echoes other than said detected echoes rejected in said rejecting step, and interpreting each said accepting echo to be an echo from a fish.

38. A method of claim 37, wherein said rejecting step includes the step of rejecting each said detected echo for which said trailing space interval is less than a predetermined time duration.

39. A method of claim 37, wherein said rejecting step includes the step of rejecting each said detected echo for which said leading space interval is less than a first predetermined time duration.

40. A method of claim 39, wherein said rejected step includes the step of rejecting each said detected echo for which said trailing space interval is less than a second predetermined time duration.

41. A method of claim 40, wherein said first predetermined time duration is approximately equal to said second predetermined time duration.

42. A method of claim 37, including the steps of cyclically repeating said transmitting, detecting, rejecting and accepting steps, maintaining a count of the number of times successive said sound pulses produce substantially equivalent echoes which are accepted during said accepting step, and providing an operator perceptible indication of a fish when said count exceeds a predetermined count value.

43. A method of claim 42, wherein said predetermined count value is four, whereby said indication of a fish is provided upon acceptance of the last of five substantially equivalent echoes from five of said sound pulses which are successive.

44. A method of claim 42, wherein said step of providing said indication of said fish includes the step of continuing to provide said indication of said fish until a predetermined delay interval after detection of a predetermined condition, and terminating said operator perceptible indication of said fish at the end of said predetermined delay interval.

45. A method of claim 44, wherein said predetermined delay interval is approximately five seconds.

46. A method of claim 45, wherein said predetermined condition includes the absence of a predetermined number of echoes substantially equivalent to said substantially equivalent echoes.

47. A method of claim 42, including the step of producing an audible sound in association with said step of providing said operator perceptible indication of a fish.

48. An apparatus for detecting fish in a body of water, comprising: first means for transmitting a sound pulse through the water in a predetermined direction; second means for detecting echoes from said sound pulse and for accepting each said echo representative of a fish; and display means responsive to said second means for selectively providing an operator perceptible indication of a detected fish, said display means including means defining an image of a substantially conical region representative of divergence of said sound pulses in said predetermined direction in said water, said conical region having an apex portion representative of a location of said first means, said display means further including means responsive to said second means for selectively displaying within said conical region said operator perceptible indication of a detected fish.

49. An apparatus of claim 48, wherein said operator perceptible indication is a predetermined icon representative of a fish.

50. An apparatus of claim 49, wherein said display means includes means for selectively displaying within said conical region a plurality of said icons at respective locations which are representative of respective distances from said first means to respective fish.

51. An apparatus of claim 48, wherein said display means includes adjacent said conical region a distance display portion providing a numerical indication of a distance to the detected fish nearest to said first means.

52. An apparatus of claim 51, wherein said numerals of said distance display portion are disposed below said conical region.

53. An apparatus of claim 52, wherein said conical region diverges upwardly in a direction away from said distance display portion.

54. A method of claim 30 including, after said transmitting step and prior to said detecting step, the steps of normalizing magnitudes of said echoes from said sound pulse based on distances travelled through the water, comparing the normalized magnitude of each said echo to a reference magnitude which is a minimum normalized magnitude produced by a fish of interest, and rejecting echoes having normalized magnitudes below said reference magnitude.

55. A method of claim 1 including, after said transmitting step and prior to said detecting step, the steps of normalizing magnitudes of said echoes from said sound pulse based on distances travelled through the water, comparing the normalized magnitude of each said echo to a reference magnitude which is a minimum normalized magnitude produced by a fish of interest, and rejecting echoes having normalized magnitudes below said reference magnitude.

56. A method of claim 55, wherein said reference magnitude, with respect to the magnitude of said sound pulse, has a value of $-36.96 \pm 5$ dB.

57. A method of claim 54, wherein said reference magnitude, with respect to the magnitude of said sound pulse, has a value of $-36.96 \pm 5$ dB.

58. A method of claim 37 including, after said transmitting step and prior to said detecting step, the steps of normalizing magnitudes of said echoes from said sound pulse based on distances travelled through the water, comparing the normalized magnitude of each said echo to a reference magnitude which is a minimum normalized magnitude produced by a fish of interest, and rejecting echoes having normalized magnitudes below said reference magnitude.

59. A method of claim 58, wherein said reference magnitude, with respect to the magnitude of said sound pulse, has a value of $-36.96 \pm 5$ dB.

* * * * *

UNITED STATES PATENT AND TRADEMARK OFFICE
CERTIFICATE OF CORRECTION

PATENT NO. : 5 260 912

DATED : November 9, 1993

INVENTOR(S) : Mark W. LATHAM

It is certified that error appears in the above-identified patent and that said Letters Patent is hereby corrected as shown below:

Column 17, line 11; change "time" to ---timer---.
             line 15; change "time" to ---timer---.
Column 18, line 37; change "form" to ---from---.

Signed and Sealed this

Nineteenth Day of April, 1994

*Attest:*

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5 260 912

DATED : November 9, 1993

INVENTOR(S) : Mark W. LATHAM

It is certified that error appears in the above-identified patent and that said Letters Patent is hereby corrected as shown below:

In the Drawings, Sheet 9, Figure 7(A), change "DISTANT" in Block 102 to ---DISTANCE---.

In the Drawings, Sheet 10, Figure 7(B), change "MODE COUNTER" in Block 119 to ---MARK COUNTER---.

Signed and Sealed this

Twenty-fifth Day of October, 1994

Attest:

BRUCE LEHMAN

*Attesting Officer*      *Commissioner of Patents and Trademarks*